(12) United States Patent
Zumpano

(10) Patent No.: US 6,513,829 B1
(45) Date of Patent: *Feb. 4, 2003

(54) INFLATABLE RESTRAINT ASSEMBLY FOR VEHICLES

(75) Inventor: Bernard J. Zumpano, Miami, FL (US)

(73) Assignee: Z/C Holding Company, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/825,036

(22) Filed: Apr. 3, 2001

Related U.S. Application Data

(63) Continuation-in-part of application No. 09/470,922, filed on Dec. 23, 1999, now Pat. No. 6,209,908.

(51) Int. Cl.⁷ .................... B60R 21/18; B60R 21/22; B60R 22/20; B60R 22/26; B60R 22/00
(52) U.S. Cl. ............... 280/730.1; 280/731; 280/733; 280/735; 280/736; 280/808; 297/484
(58) Field of Search .................. 280/729, 730.1, 280/730.2, 731, 733, 735, 736, 742, 808, 801.2; 297/483, 484, 486

(56) References Cited

U.S. PATENT DOCUMENTS

| 3,430,979 | A | * | 3/1969 | Terry et al. ............... 280/733 |
| 3,466,090 | A | * | 9/1969 | Posey ..................... 297/484 |
| 3,703,313 | A | * | 11/1972 | Schiesterl et al. ........ 280/730.1 |
| 3,802,719 | A | * | 4/1974 | Brown ..................... 280/729 |
| 5,131,683 | A | * | 7/1992 | Johnson ................... 280/808 |
| 5,292,176 | A | * | 3/1994 | Artz ....................... 297/484 |
| 5,470,103 | A | * | 11/1995 | Vaillancourt et al. ...... 280/730.1 |
| 5,472,234 | A | * | 12/1995 | Chang ..................... 280/808 |
| 5,642,902 | A | * | 7/1997 | France .................... 280/733 |
| 5,707,078 | A | | 1/1998 | Swanberg et al. |
| 5,806,891 | A | * | 9/1998 | Pokhis .................... 297/483 |
| 5,842,718 | A | * | 12/1998 | Byon ...................... 280/735 |
| 5,927,753 | A | | 7/1999 | Faigle et al. |
| 5,947,514 | A | | 9/1999 | Keller et al. |
| 6,217,069 | B1 | * | 4/2001 | Ganesan .................. 297/483 |
| 6,237,945 | B1 | * | 5/2001 | Aboud et al. ............. 280/733 |

* cited by examiner

Primary Examiner—Peter C. English
(74) Attorney, Agent, or Firm—Duane Morris LLP

(57) ABSTRACT

A restraint assembly intended for use primarily, but not exclusively, within motor vehicles to protect occupants from injury resulting from a collision, crash or other impact type of accident in which the vehicle is involved. A plurality of inflatable members are mounted at a plurality of strategic locations relative to the various positions assumed by occupants within the vehicle, such that upon the vehicle being impacted, a central processing unit or like processor structured to sense the impact will automatically inflate the inflatable members so that they assume a protective position which will interact with the occupant to actively absorb and resist the force of the impact resulting from the occupant coming into contact, at an accelerated rate, with the inflatable member(s). A restraining harness is positionable into restraining relation to one or more occupants and includes a lap belt segment, a chest belt segment and a diagonal belt segment extending in overlying relation to an occupant's frontal area and between opposite ends of the lap belt segment and chest belt segment, such that the belt segments collectively form a substantially "Z-shaped" configuration.

35 Claims, 14 Drawing Sheets

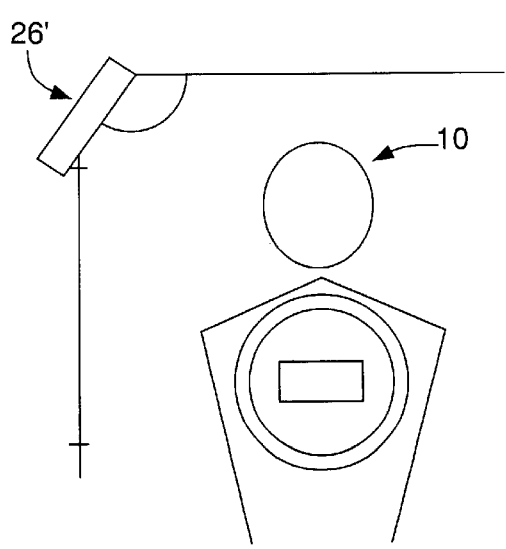
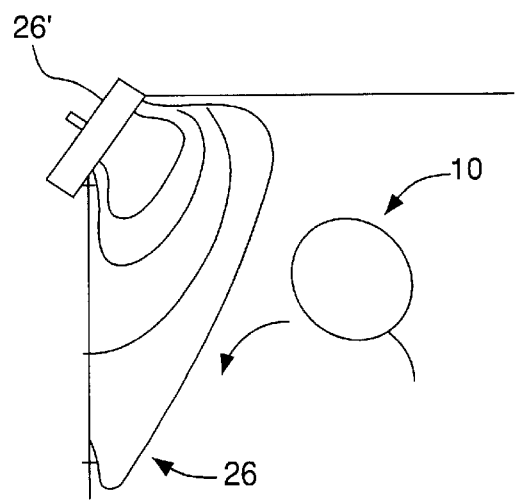
FIG. 6                FIG. 7
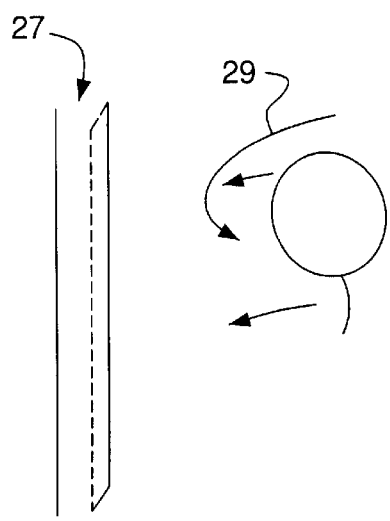
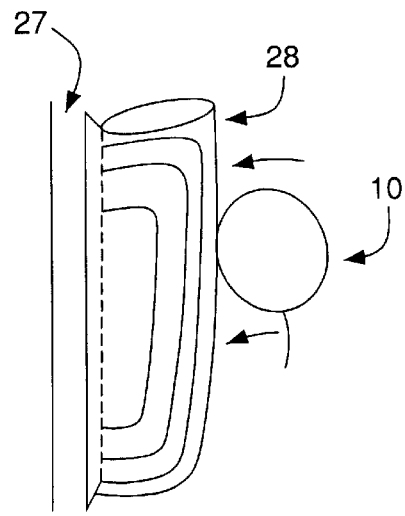
FIG. 8                FIG. 9

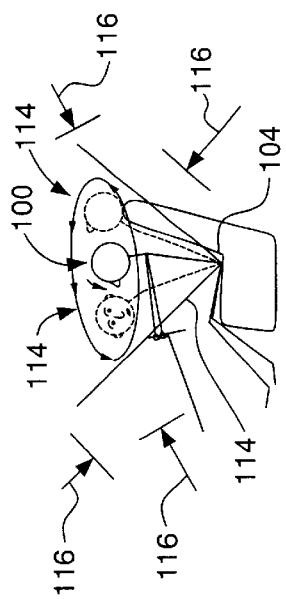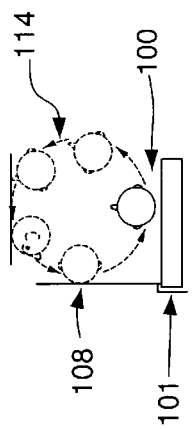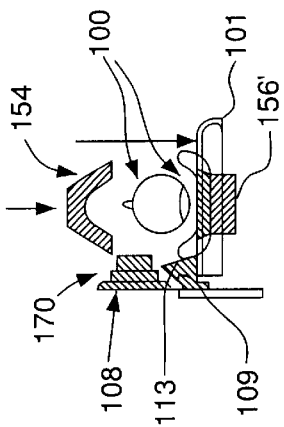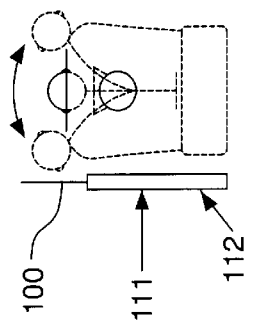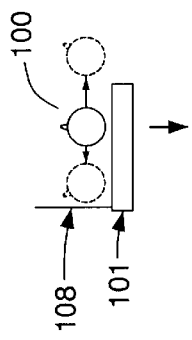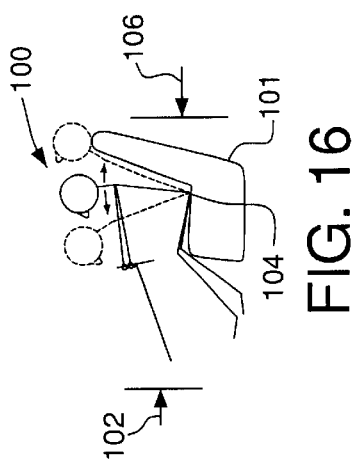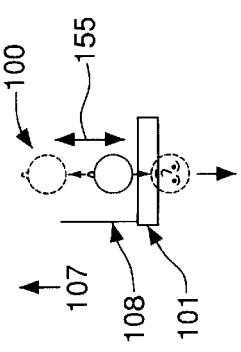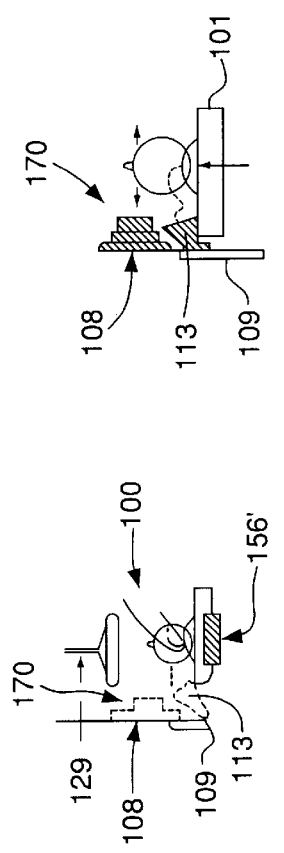

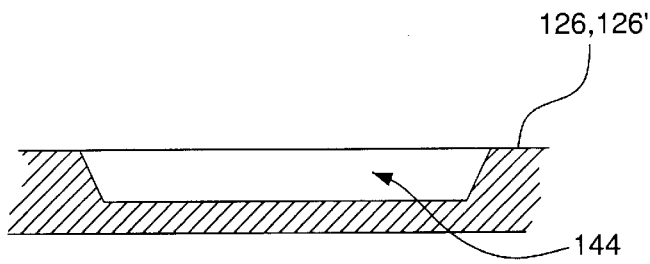
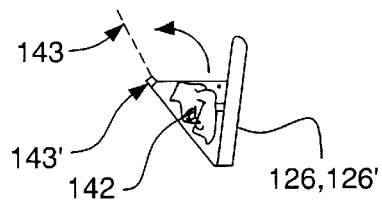
FIG. 34
FIG. 35
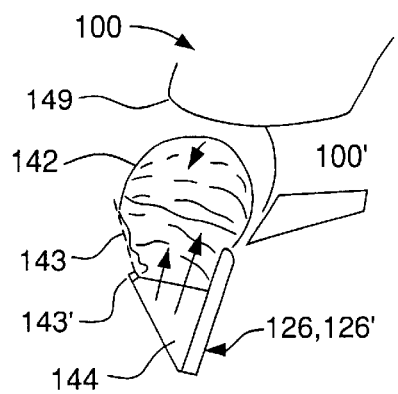
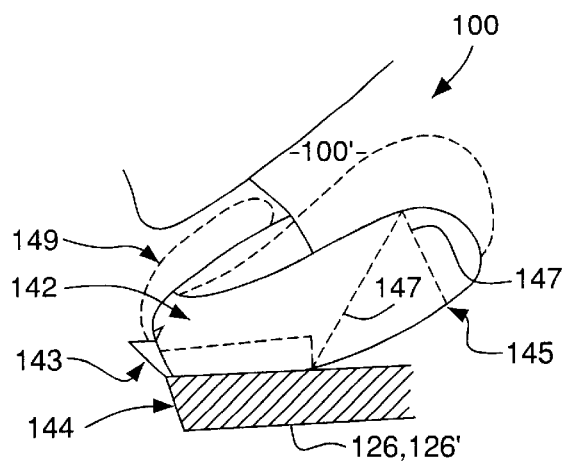
FIG. 36
FIG. 37
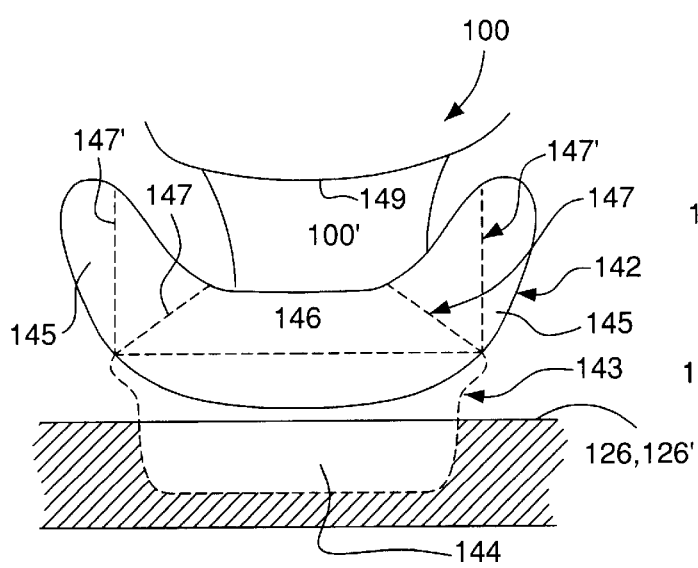
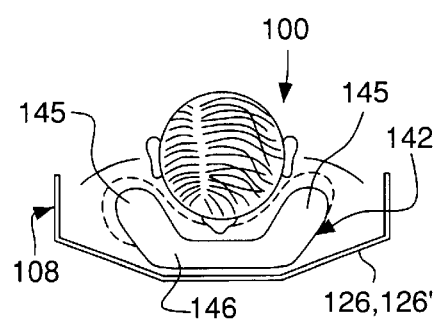
FIG. 38
FIG. 39

INFLATABLE RESTRAINT ASSEMBLY FOR VEHICLES

CLAIM OF PRIORITY

The present application is a continuation-in-part application of Application Ser. No. 09/470,922, filed on Dec. 23, 1999, which issued as U.S. Pat. No. 6,209,908 on Apr. 3, 2001.

BACKGROUND OF THE INVENTION

1. Field of the Invention

This invention relates to an inflatable restraint system primarily designed for use within a motor vehicle to protect occupants when the vehicle is involved in an accident, and specifically, a collision or other type of crash or impact. The inflatable restraint system comprises a central processing unit or other processor operatively connected to both a sensor assembly and a valve assembly in order to initially inflate and actively regulate pressure within a first and second plurality of chambers, respectively defining impact absorption and impact resistance zones, disposed on the interior of each of one or more inflatable members mounted at strategic locations adjacent intended occupant positions within the vehicle.

2. Description of the Related Art

Every year, thousands of people in the United States alone are involved in motor vehicle accidents, many of which result in the death of one or more occupants and/or severe bodily injury to others. Aside from the devastation and havoc these accidents cause in people's lives, they also result in costs of over five billion dollars annually to the insurance industry, health care industry, health care providers, the federal government, public health agencies and many others. It should, therefore, be clear that the cause of morbidity (long term injury consequences) to the automobile and insurance industries is staggering.

Most current methods of reducing injury are predicated upon the principals of safety restriction and immobilization using seat belts and the use of single or multiple air bags. With regard to the inflation of the air bags in an emergency condition, the in-filing pressure dynamics are known to cause direct chest, face, eye, and sometimes brain and spinal injury when they are deployed against the passenger in an attempt to deal with impacting forces only from the view point of the passive absorption of such forces. Moreover, known air bag structures and designs are inflated towards the occupant. Accordingly, with regard to conventional seat belt construction, diagonal chest belt restraints, are disposed such that they have a tendency to rub across an anterior portion of the neck. Medical publications report complications of carotid artery thrombosis and subsequent stroke from blunt trauma to the neck from seat belts. Similarly, lap seat belts are known to cause pelvic and extremity injuries as well as blunt abdominal trauma. The fact that such air bags and seat belts save lives and reduce injury is not in question. However, most vehicular injuries, particularly those occurring at high speeds are not entirely predictable or preventable, especially with the use of these known or conventional devices.

The mechanisms which cause injuries in humans involve the summation of deceleration forces, and in particular, those linear momentum, angular momentum and torque-rotation, vertex-loading, centripetal and centrifugal forces, coefficient restitution forces and spinal "crunch" forces. Most of these cannot be prevented because they occur probably within the first three seconds of low velocity accidental impact, and within the first 150 milliseconds of high velocity impacts, wherein the effect of such forces is completed, usually within 250–350 milliseconds. Thus, early on, the forces have already acted to produce injury and conventional seat belts and air bags become passive recipients of those forces, reducing them somewhat but not actively opposing them.

Accordingly, it should therefore be recognized that some injuries are due more to linear momentum and deceleration forces, and others to angular momentums with deceleration forces. Added to these are a combination of torque forces, centrifugal and centripetal forces and the "crunch" forces due to spinal loading. Moreover, all of these forces are summated by the time the air bag is impacted by the body of the occupant. As set forth above, the result is that the most the belt restrains and air bags can do, even when cooperatively reacting with one another, is to possibly absorb such forces. When the summation of these forces are greater than the ability of the human body to tolerate them, tissue deformation occurs with the resulting injury.

None of the injuries, which occur in motor vehicle accidents, are totally predictable or preventable since the exact time or circumstances of a motor vehicle accident are not always known or predictable. In other words in most instances where serious accidents are under consideration, the current state of the art permits incomplete reduction of injury forces with the result being that total prevention remains illusive. Similarly, no two human bodies react in the same way to injury forces. In other words, the variables over which there is no control are significant. To date, there is no known way to totally prevent injury, particularly in high velocity conditions. There is however, a better way to reduce and control the harm caused by the summation of forces of deceleration, which cause injury.

As set forth above attempts to protect the occupants in a motor vehicle have for the most part included seat belts, also known as restraint harnesses and more recently, inflatable air bags. Such devices are most certainly a step in the right direction, and when used properly, have saved a tremendous number of human lives. Even so, both seat belts and air bags suffer from distinct disadvantages. By way of example, harness restraints including lap belts, chest belts, etc., limit the forward or lateral motion of the body's acceleration caused by an impact, but in doing so, such restraints cause the base of the neck to act as a fulcrum or axis of rotation-flexion-extension to further accentuate the force of acceleration of the head on the neck. More specifically, when there is a collision, the motor vehicle is usually stopped by the impact, but the forces applied to the body and restrained by the seat and/or lap belts are nevertheless also acting to set the head in motion upon the neck, leading to impact injuries caused by a collision of the head against the front or side window, ceiling of the car or steering wheel. Thus, the common mechanism of injury to the brain, spine and/or spinal cord in head-on collisions is an acceleration of the head, and the neck, causing a hyperflexion-hyperextension injury, whereas in broad-side collisions, the head is accelerated to the side or laterally causing a lateral-flexion injury.

Most modern day motor vehicles use a combination of restraint harnesses and inflatable air bags, which typically, inflate during a collision in an extremely rapid manner from the steering wheel and/or front console area of the vehicle and towards the occupants. Thus, inflatable air bags are intended to cushion the occupant as he or she is thrust forward, under the forces being applied during a head on collision, and impacts the air bag. While the provision of air bags on modern day motor vehicles has certainly brought down the mortality rate, meaning that more people can survive the violent forces of a head on collision, the injury rate is thought to have increased, meaning that survivors of these and other types of crashes often suffer from serious head, neck and/or spinal cord injuries. That is because by the time the air bags are deployed, the forces caused by the vehicular impact are already acting on the body and, as set forth above, cause acceleration of the head on the neck as well as of the torso on the hip. In some instances, air bags have even been reported to cause nasal and facial fractures and, in extreme circumstances, result in the forcing of bone fragments into the brain. Further, the direction of air bag discharge is almost invariably towards the occupant and can promote hyperextension injury to the spine or posterior head injury. This is prevalent and can be particularly dangerous in elderly persons with osteoporosis, a thinning of the bones with age due to calcium depletion.

There have been some attempts to improve the protection for motor vehicle passengers, which have primarily been directed to the deployment of air bags from multiple locations within the vehicle, in order to surround an occupant with restraints. Such attempts have found favor and are promoted primarily by some European car manufactures, most notably those which proclaim the benefits of "side air bags." While adding to the expense of the automobile, these and other multi-location deployment systems have been offered in response to an increased demand to solve the problem of multiple trauma injuries, prevalent in impact accidents. Further, such attempts reflect the desire of the motor vehicle industry to control and find a solution to problems that continue to cause death, disability and injury at an ever increasing rate. Such attempts are also a positive step forward in the effort to reduce death and serious bodily injury during accidents due to direct impact to the vehicle. However, even air bags that deploy from the side or other location in a motor vehicle do not effectively address the forces at work during an impact that cause acceleration of the head relative to the neck, and/or of the neck relative to the torso, and therefore, the problem of brain, spine, neck and torso injuries resulting from such accidents have also not been adequately addressed.

Accordingly, there remains a need in this art for a restraint assembly which is designed and structured to more actively intercept at least the head and neck motion of an occupant riding in a motor vehicle undergoing a collision or other impact. More specifically, there is a need for an inflatable restraint assembly which attempts to reverse the forces of impact between a passenger and an air bag, sufficiently to diffuse such forces by applying an equal and opposite force, while buffering the passenger's impact, and thereby, reducing dynamically and actively, the range of motion of the head, neck and torso, caused by the impact. Any such improved restraint assembly developed would preferably also utilize at least two, oppositely disposed and pressure sensing inflatable members, each having a plurality of chambers, and further, through the application of microcomputer-microprocessor technology, initiate a positive gradient increase in pressures to some, but not all chambers of each pressure sensing inflatable member, for the specific purpose of slowing the acceleration forces at work on an occupant's body, while applying an equal and opposite force to the force of impact of the occupant's body with the other(s) of the inflatable members. Any such improved restraint system should further include a plurality of inflatable restraint devices or bags strategically located at various points throughout the passenger compartment, including but not necessarily limited to the ceiling, door post and seat belts, so as to provide as much surrounding or "global" protection as possible, with the goal being to significantly reduce injury by a reduction of the forces exerted on the occupant's body during impact type accidents. In addition, any such improved restraint assembly developed should also overcome the long existing problems of known restraint systems through the ability to actively oppose impact forces "intelligently" through a series of dynamic pressure measurements conducted in response to the acceleration-deceleration of the various portions of the passenger's body as the body impacts substantially oppositely disposed, but cooperatively positioned, inflatable members.

In addition to the above, any such improved restraint assembly developed should have the capability of storing data for determining and recalling related information, such as predicted speed of impact and a record of pressure sensing data. Such data could be correlated with post injury medical findings to determine, over a period of time, what impact and pressure ranges cause disabling injury as versus those impact and pressure forces which are only suspect at the present time. Such memory capabilities would serve as a meaningful tool of analysis and benefit to the medical and insurance industries, among others.

Finally, a preferred restraint assembly should also incorporate the use of a restraining harness which is adjustable to accommodate occupants of various sizes and is structurally modified to better protect, in terms of restraint, various portions of the occupants body. In addition, the restraining harness may further include at least one inflatable member which may be structured as described above and when inflated is directed outwardly from the restraining harness and the frontal area of the occupant.

SUMMARY OF THE INVENTION

The present invention is intended to address these and other needs which remain in the art and is directed towards an inflatable restraint assembly that is primarily, but not exclusively, designed for use within a motor vehicle. The restraint assembly comprises a plurality of inflatable members, which are strategically mounted throughout the interior passenger compartment of the vehicle at locations adjacent to an intended occupant position, such that deployment of one or more of the inflatable members will provide maximum protection to an occupant, when located in one of the intended positions normally occupied. Further, it is emphasized that while a detailed explanation of the structural and operative features of the present invention will be described relative to at least one inflatable member, one feature of the present invention is the cooperative positioning of two or more of such inflatable members, so as to be "globally" oriented or collectively disposed in at least partially surrounding, alternatively intercepting relation to each of the occupants. Such cooperative and collective positioning of a plurality of the inflatable members of the present invention are, in certain instances, specifically intended to significantly reduce injury to the occupant caused by an excessive acceleration or forward motion followed immediately by a rebounding deceleration, which often occurs through the use of conventionally known air bags or inflatable restraint devices. In such known systems, the conventional air bag structure is forcibly inflated resulting in a deployment of the bag in a direction substantially towards the occupant. As a result, the occupant frequently suffers damage upon impact with the conventional air bag and quite frequently suffers hyperextension and/or hyperflexion type injuries, due to a forceful forward and backward acceleration of the head on the neck and/or the body torso upon the lower back and hip.

In order to avoid these types of well recognized problems associated with the use of conventional inflatable restraint systems and structures, the present invention utilizes a central processing unit or other type of processor, which is electrically connected or otherwise operatively associated with a valve assembly and a pressure sensor assembly, so as to initially deploy, through inflation, the one or more inflatable members into their operative position. The processor, valve assembly and sensor assembly are operatively interactive to diffuse the force of impact caused by the occupant contacting cooperatively positioned ones of the plurality of inflatable members. More specifically, each of the inflatable members of the present invention actively opposes the force of impact between the occupant and the inflatable member and does so "intelligently" through a series of dynamic pressure measurements, made each time the head, neck or torso of the occupant rocks in a "to-and-fro" motion, impacting at least one, but under certain conditions, at least two substantially opposing and alternately intercepting inflatable members.

The sensor assembly is structured to detect the pressure inside a plurality of internally disposed chambers within each of the inflatable members, and to relay the data relating to the internal pressure within the various chambers of each of the inflatable chambers to the processor. The processor activates a source of inflatable material or fluid, such as air, and initiates operation of the aforementioned valve assembly to provide an initial inflation pressure in predetermined ones of the plurality of chambers of the one or more inflatable members. The pressure within each of the inflatable chambers is then actively regulated or adjusted to accommodate the force of impact of the occupant with inflatable member in a manner which causes both a resistance to and at least a partial absorption of the force of impact. The active and "intelligent" regulation of the pressure within the inflatable members serves to reduce any type of repetitive to-and-fro motion, as set forth above. When two substantially opposing inflatable members are working in concert, each has the internal pressure thereof actively regulated or adjusted on an alternating, repetitive basis in order to reduce the to-and-fro motion or acceleration-deceleration of the occupant, to a series of lesser motions or oscillations of the head and torso.

Upon the vehicle being impacted, at least one of a plurality of impact sensors, located on the vehicle and connected to the aforementioned processor, communicates in micro-seconds the occurrence of an impact of sufficient predetermined force to possibly cause injury to the occupant within the passenger compartment. Upon such indication, the processor activates also within micro-seconds a source of fluid or other inflatable material and/or the valve assembly to cause an initial inflation and resulting deployment of at least some of a plurality of inflatable members.

At least one, but preferably all, of the inflatable members comprise a number of internally disposed chambers, wherein adjacent ones of such chambers are separated from one another by a partition. While the actual number of chambers within each inflatable member may vary, the chambers are collectively disposed and cooperatively structured to define an impact absorbing zone and an impact resistance zone within each of the inflatable members. For purposes of clarification, the impact absorption zone may be defined by at least one, but most probably, a first plurality of internally disposed chambers defining a "leading" portion of the inflatable member. The term "leading" portion is meant to describe that portion of the inflatable member which first contacts the head or other portion of the occupant's body. The impact resistance zone is located "rearwardly" of the impact absorption zone and is defined by at least one but preferably a second plurality of chambers.

While the inflatable restraint assembly of the present invention contemplates the use of at least one inflatable member having the aforementioned impact absorption zone and impact resistance zone, maximum protection to the one or more occupants may best be provided through the use of at least two of the aforementioned inflatable members, disposed in substantially opposing relation to one another. When such two inflatable members are cooperatively positioned they each act as "interceptors" for the purpose of reducing the normal, relatively excessive to-and-fro motion to lesser oscillations by allowing the force of impact of the occupant onto a first of the inflatable members to be at least partially absorbed, but at the same time, resistant by actively regulating the pressure within the first inflatable member. At the same time, the pressure within the inflatable member needed to respond to the degree of the force of impact of the occupant thereon is determined. This information is then relayed, through cooperative workings of the sensing assembly with the processor, to communicate the expected and/or summate force of impact of the occupant onto the second or intercepting one of the cooperatively positioned two inflatable members. The relayed information then allows the pressure within the second of the inflatable members to be further regulated or varied to again absorb the force of impact onto the second inflatable member. As will be explained in greater detail hereinafter, the processor and sensor assembly are cooperatively structured and operationally functional so as to arrive at a summation of the pressure within each of the inflatable members and vary the total pressure so as to accomplish absorption of the force of impact of the occupant by means of at least partial deflation of the impact absorption zone while maintaining a sufficient resistance force in the impact resistance zone of each inflatable member. The summation of the pressure within any of the inflatable members, should not exceed the force of impact of the occupant onto the inflatable member, so as to not result in a forcible rebounding of the occupant, which would add to the acceleration/deceleration or to-and-fro motion of the occupant.

The inflatable restraint assembly of the present invention also comprises one or cooperative pairs, or more, of the inflatable members being located strategically throughout the various portions of the passenger compartment, wherein such strategic locations include but are not limited to the ceiling, side or door post of the vehicle, shoulder or body harness, etc. In addition, the one or more inflatable members could be mounted directly on an auxiliary seat, such as a child seat, so as to be structured to operate in substantially the same manner. In each of the aforementioned embodiments, one feature of the present invention is that in most cases, the initial inflation and deployment of each of the inflatable members does not occur in a direction that is directly towards the occupant. Such directional deployment of known conventional air bags has, as set forth above, in some cases resulted in severe injury to the occupant.

The various preferred embodiments of the present invention as described above, as well as additional preferred embodiments to be described hereinafter, are intended to overcome many of the disadvantages and problems associated with conventional restraint systems. As with the preferred embodiments described above, the preferred embodiments described hereinafter are specifically directed to better protect occupants in a motor vehicle.

More specifically, the improved restraint assembly of the present invention is primarily based on a recognition of the fact that front end motor vehicle impacts primarily cause anterior/posterior flexion of the head, neck and the spinal column, wherein the junction of the base of the spine in the low back serves as the fulcrum or point of motion. This is the location where the lumbar spine fixates to the pelvis and sacrum. The spinal column therefore acts as a long lever, "whipping" the head upon the neck, with or without internal impacts within the vehicle. Side collisions do the same, but put the spinal column, head and neck in a whipping direction of lateral flexion, from side to side. oblique impacts from either front or rear diagonal impact positions add a component of rotation and angular momentum to the long lever-arm of the spinal column, causing what may be generally referred to as a "conical" range of motion of angular momentum of the head and neck upon the base of the spine. In further defining the aforementioned conical range of motion, the base of the spine is used as or defines the apex of the formed conically configured range of motion.

Video tape footage of dummy collision models frequently demonstrate forces of both momentum and rotation, as well as the lack of adequate restraint provided by diagonal seat belt (chest) restraints. Their failure to adequately eliminate the aforementioned lever action of a long lever arm (the entire spinal column), causes frequent severe whipping of the head on the neck, by a combination of torque, centrifugal, and rotational forces, all responsible for head and neck injuries including "whiplash". Therefore, the additional preferred embodiments of the restraint assembly of the present invention provides strategically and "globally" placed inflatable members, which may be computerized or processor controlled. Further, the plurality of inflatable members are specifically disposed to be operatively oriented relative to strategic passenger positioning, as will be described in greater detail hereinafter.

Further, the restraint assembly of the present invention accomplishes strategic movement restriction of the spinal column, head and neck to reduce the forces of deceleration, linear and angular momentum, flexion, extension and rotation through the use of a plurality of inflatable members and/or a restraint harness. More specifically, in certain strategic locations within a vehicle, one or more of the inflatable members are deployed away from the body towards, for example the steering wheel. In this particular embodiment, one or more deployed inflatable members meet and confront a cooperatively disposed and structured inflatable member, issuing from the steering wheel. Also and importantly, the ventral space disposed in front of the body is reduced. This therefore, serves to fill the emptiness or void into which the body has a tendency to move during the type of impacts or emergency conditions described herein.

Other structural features of the additional preferred embodiments of the present invention include adjustable belt segments of a restraining harness, such as a chest belt segment thereof. The chest belt segment is operatively disposed in a substantially horizontal orientation and in overlying, protective relation to the upper chest of the occupant. In addition, yet another structural modification of this preferred embodiment may include an additional or supplementary inflatable member mounted within a receptacle in the chest belt segment or other portions of the harness. When deployed the supplementary or additional inflatable member extends upwardly, underneath the chin area and is further dimensioned and configured to extend laterally about opposite sides of the neck. Therefore, there is a reduction in the forces of neck flexion and, perhaps, lateral flexion. The chest belt segment of the restraining harness therefore significantly reduces the lever arm action of the spine on the low back, almost to the point of elimination. Accordingly, since angular momentum is proportional to the length of the lever arm which sets the head in motion, the fulcrum of the lever arm is displaced from the low back to the base of the neck (C7 through T1 vertebrate). This makes the lever arm of the spinal column shorter. A shorter "lever arm" means smaller angular momentums which are translated into reduced forces of injury or possibly preventable injuries.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6 is a schematic representation of one preferred location of an inflatable member in accordance with the present invention.

FIG. 7 is a schematic representation of the embodiment of FIG. 6 with the inflatable member in a deployed position.

FIG. 8 is a schematic representation of another preferred location of at least one inflatable member of the present invention.

FIG. 9 is a schematic representation of the embodiment of FIG. 8 with the inflatable member being deployed.

FIG. 16 is a side view in partial schematic demonstrating forces to which the occupant is exposed in a front and rear impact accident.

FIG. 17 is a top view in partial schematic of the embodiment of FIG. 16.

FIG. 18 is a side view in partial schematic demonstrating forces to which an occupant is exposed in a side impact accident.

FIG. 19 is a top view of the embodiment of FIG. 18.

FIG. 20 is a side view in partial schematic demonstrating forces and a range of motion to which an occupant is exposed in an oblique impact accident.

FIG. 21 is a top schematic view of the embodiment of FIG. 20.

FIG. 22 is a top view of various inflatable members strategically and globally mounted within the vehicle to protect an occupant from impact forces as demonstrated in FIGS. 16 and 17.

FIG. 23 is a top view showing additional inflatable members which are positioned within the vehicle to protect an occupant from impact forces as demonstrated in FIGS. 18 and 19.

FIG. 24 is a top schematic view disclosing the placement of a plurality of inflatable members collectively comprising an additional preferred embodiment of the present invention which protects the occupant from impact forces on the vehicle encountered from a number of different directions.

FIG. 34 is a top view in section and partial cutaway of yet another preferred embodiment of the restraining assembly of the present invention.

FIG. 35 is a sectional view in partial phantom of the embodiment of the FIG. 34.

FIG. 36 is a side view of the embodiment of FIGS. 34 and 35.

FIG. 37 is a side view of the embodiment of FIGS. 34 through 36.

FIG. 38 is a front view of the embodiment of FIG. 37.

FIG. 39 is a top view of the embodiment of FIG. 38.

Like reference numerals refer to like parts throughout the several views of the drawings.

DETAILED DESCRIPTION OF THE PREFERRED EMBODIMENT

As shown in the accompanying drawings, the present invention relates to a restraint assembly designed primarily, but not exclusively, to protect occupants, generally indicated as 10, within a motor vehicle, generally indicated at 12.

Figure 1:
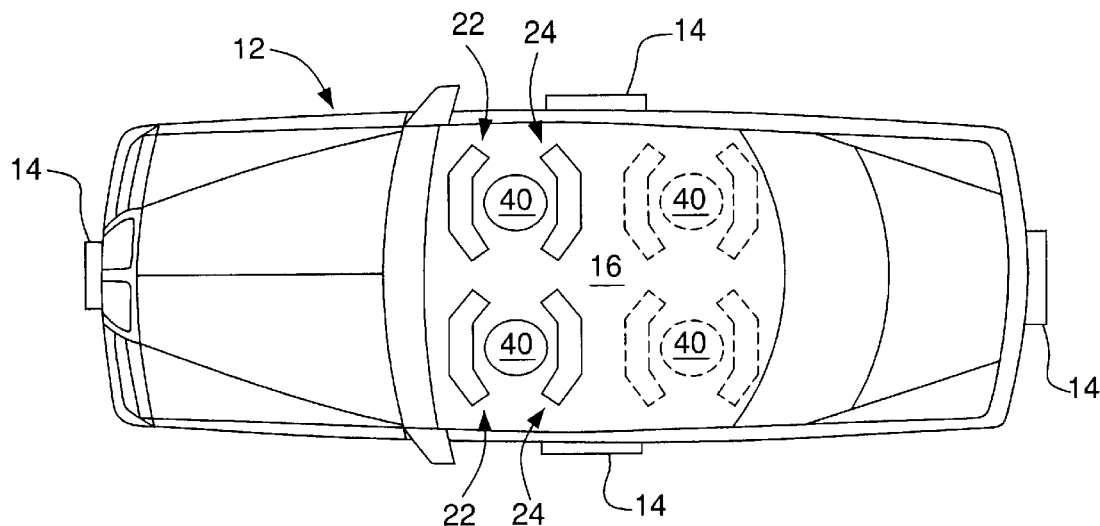
FIG. 1 is a top view of a vehicle showing interior portions and the general locations of a plurality of cooperatively disposed inflatable members relative to an intended position of an occupant within the vehicle.
Figure 3:
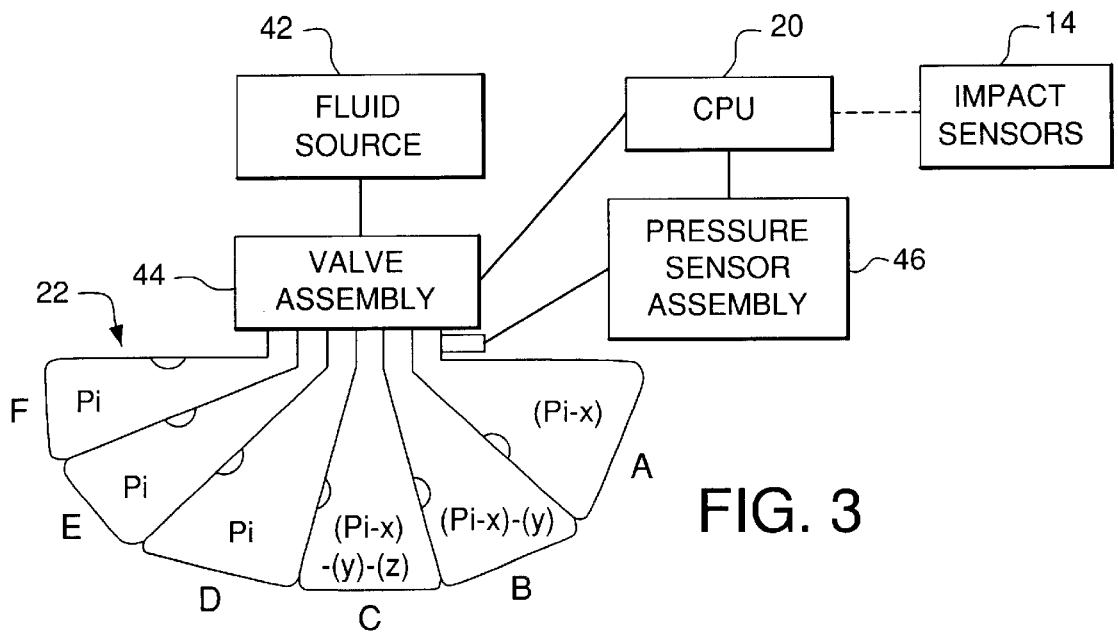
FIG. 3 is a schematic representation of a representative one of the inflatable members along with the operative components of the assembly causing its inflation and pressure regulation.

More specifically, and as shown in FIG. 1, the vehicle 12 is equipped with a plurality of impact sensors, as at 14, located at various positions on the vehicle, so as to sense the occurrence of an impact of sufficient degree to possibly cause harm to occupants within the passenger compartment 16 of the vehicle 12. The location of the impact sensors 14 in FIG. 1 is meant to be representative only of a plurality of locations where such impact sensors 14 could be positioned, the knowledge of which is possessed by persons of skill in the art relating to air bag deployment. In addition, and as shown in FIG. 3, the impact sensors 14 are operably connected and/or coupled to a computer processor, such as a micro-processing chip or other central processing unit (CPU) 20, incorporated within the vehicle 12 and responsive to the impact sensors 14 to the extent of activating one or more of the inflatable members, such as 22, 24, etc., incorporated within the restraint assembly of the present invention. As shown in FIG. 1, an inventive feature of the present invention is the strategic location of the plurality of inflatable members in an operative position, relative to the plurality of intended positions 40 of the occupants. The intended occupant positions 40 are representative only since such positions may vary depending upon the size and configuration of the vehicle.

Figure 2:
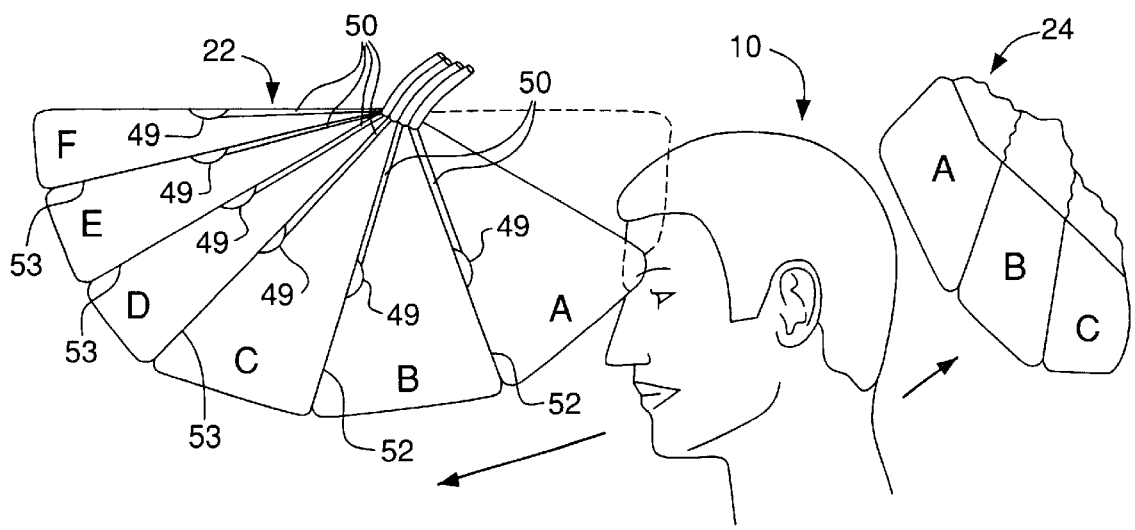
FIG. 2 is a schematic representation in partial cutaway of an occupant relative to two cooperatively disposed inflatable members.

With regard to FIGS. 1 and 2, one embodiment of the present invention includes inflatable members 22 and 24 located in substantially opposing relation to one another and in a position relative to an occupant 10 to receive the repetitive and alternating "to-and-fro" motion resulting from the occupant's head (or other portions of the occupant's body) contacting a first inflatable member 22 and then, in a rebounding motion, contacting an intercepting, second inflatable member 24. For example, when a vehicle is involved in a head-on collision, the occupant's head 10 would initially be thrust forward and into a first, forwardly disposed inflatable member, such as 22 in FIGS. 2, 4 and 5, and would then rebound into a second, rearwardly disposed inflatable member, such as 24 in FIG. 2. Of course, if the impact were coming from the opposite direction, the occupant's head 10 could initially be thrust into contact with the rearwardly disposed inflatable member 24 and then into the forwardly disposed inflatable member 22, and thus, the terms "first" and "second" or "forward" and "rearward" should not be construed in a limiting sense.

To assume the cooperative, substantially opposing relation of the first and second inflatable members 22 and 24 respectively, such inflatable members would preferably be mounted in the ceiling in a collapsed, stored position maintainable by pivotally attached cover members, which are forced open upon a pressurized inflation of the inflatable members 22 and 24. As will be explained in greater detail, particularly with reference to FIGS. 6 through 15, the inflatable members may be used independently of one another or in cooperative relation with one another and may be mounted at a variety of other strategic locations within the passenger compartment 16 in order to protect the occupant 10 from an impact occurring on or to the vehicle 12 from the front, rear, side, top, etc.

With primary reference to FIGS. 2 through 5, the structural and operational features of a single inflatable member 22 will now be described. It is pointed out, however, that each of the inflatable members, whether working independently of one another or in cooperative relation to one another, as explained with referenced to FIG. 2, have a substantially equivalent structure and operation. Accordingly, the inflatable restraint assembly of the present invention comprises a fluid source 42 which may include one or a plurality of sources of air, gas, gel, or other inflatable fluid material, wherein each of the plurality of inflatable members, such as 22 and 24, or such as 26 and 28 shown in FIGS. 7 and 9, may be connected in fluid communication with a separate fluid source or different, independent fluid sources. In addition, a valve assembly 44 is operatively connected with each of the inflatable members 22 so as to regulate flow to and from the interior thereof, in a manner to be described in greater detail hereinafter. Also, a pressure sensing means, preferably comprising a pressure sensor assembly 46, is associated with each of the inflatable members 22, 24, 26, 28, etc. in a manner which serves to sense the pressure in various portions or zones on the interior thereof and relay such sensed pressure to the processor or CPU 20. The CPU 20 controls and activates the valve assembly 44 to actively regulate and/or vary the pressure between the various portions or zones of each of the inflatable members, as will be explained.

Each of the inflatable members is defined by a multi-chamber construction wherein, in the specific embodiment shown in FIGS. 2 through 5, a first plurality of internally disposed chambers A, B, and C define an "impact absorption zone" which is located generally on what may be termed a leading portion of the inflatable member 22. A second plurality of chambers D, E, and F may define what is referred to as an "impact resistance zone" and are located on a trailing portion of the inflatable member 22, relative to the direction of travel or motion of the occupant 10 when engaging the inflatable member 22, during an accident. It is emphasized that the number of chambers in the impact absorption zone as well as the impact resistance zone may vary, and further, that the number of chambers in each zone may differ from one another. The sensor assembly 46 is specifically structured to sense the pressure within each of the aforementioned chambers A, B, C, D, E, and F and may comprise a plurality of individual sensors 49 connected by appropriate wiring 50 to a printed circuit board or like controller mechanism (not shown) incorporated within the sensor assembly 46, which in turn, is connected to the processor or CPU 20. It is to be emphasized that a variety of other individual sensor structures, other than sensors 49 may be incorporated and operative to perform the primary function of sensing the pressure within each of the individual chambers A, B, C, D, E, and F in relaying such sensed or determined pressure back to the controller incorporated within the main body of the sensor assembly 46.

Each of the adjacent chambers are at least partially segregated from one another by an appropriately positioned partition 52 or 53. More specifically, each of the partitions 52 serves to at least partially segregate the internal chambers A, B, and C of the impact absorption zone and include an apertured construction in order to allow at least some fluid flow there through. This embodiment serves to facilitate a partial collapse or deflation of the impact absorption zone by allowing the fluid to be forced from chamber A to chamber B and eventually to chamber C, where it then may flow out, from the chambers of the impact absorption zone through the valve assembly 44. Conversely, the partitions 53 serving to separate the various internal chambers of the impact resistant zone from one another, as well as the chamber C from the chamber D, do not have any type of apertured construction and are, therefore, structured to define total segregation and to not permit air flow to pass between the chambers D, E and F, of the impact resistance zone, for reasons which will be made clear upon further description set forth hereinafter. The valve assembly 44 serves to regulate fluid flow into and out of each of the internal chambers A, B, C, D, E, and F and may take a variety of configurations, which are structurally and operationally capable of independent flow into and out of the individual chambers A, B, C, D, E, and F, as well as the selective maintenance of the pressure within certain ones of the chambers and deflation of certain others of the plurality of chambers.

The workings of the one or more inflatable members 22, 24, etc., independently or in combination with one another, and the gradient pressure differential between the various internal chambers A, B, C, D, E, and F in particular, will now be explained. The term "gradient pressure differential" is meant to include the difference in pressures between each of the chambers of the inflatable members specifically wherein some of the internal pressures of various ones of the chambers are greater than in others. Accordingly, for purposes of explanation, the initial inflation pressure will be represented as Pi and will also be equal to the pressure within the second plurality of chambers D, E, and F, defining the impact resistance zone of each inflatable member 22. The pressure in chamber A, being the first or leading internal chamber of the impact absorption zone, is maintained lower than the initial inflation pressure Pi, by an increment of pressure represented as (x). Therefore, the total pressure in chamber A before the force of impact of the occupant with that inflatable member may be expressed as (Pi-x).

The pressure in chamber B will be lower than the pressure in chamber A, and accordingly, lower than the pressure Pi maintained in chambers D, E, and F. In relationship to chamber A, the pressure in chamber B will be lower by a value (y) and may be expressed as (Pi-x)-(y).

The pressure in chamber C will be lower than that in chamber B by a value (z). Therefore, the pressure in chamber C may be expressed as (Pi-x)-(y)-(z).

Accordingly, it should be seen that the collective pressure in chambers A, B, C, is lower than the pressure Pi maintained in chambers D, E, and F.

In operation, the force of impact of an occupant 10 on an inflatable member 22 causes a transfer of pressure from chambers A to B to C, and if pressure within these chambers is excessive, beyond a certain threshold point which may threaten the integrity of the structure of the inflatable member 22, an out-flow of air through the valve assembly 44 occurs. The sensor assembly 46 summates the transmission of pressure forces, expressed as a change of pressure, while chambers D, E, and F provide initial resistance to the force of impact of the occupant 10. The processor 20 then "reads" the force of impact of the occupant that needs to be opposed and rapidly deploys a discharge of air from the fluid source 42 to the chambers D, E, and F. As set forth above, chambers D, E, and F do not communicate with one another so that disruption of the integrity of one chamber, due to shear forces or tearing, will not compromise the function of the entire inflatable member 22. This rapid deployment of air into chambers D, E, and F, occurs in increments and creates an equal and opposite force to the force of impact, but not a greater force than the force of impact, so as to provide an active opposition to and correction of the force of impact of the occupant. This correction serves to slow the acceleration of the occupant, as well as the occupants range of motion. This, in turn, reduces the momentum upon the body part of the occupant 10 contacting the inflatable member 22, and further reduces successive to-and-fro motions to lesser oscillations of motion of the occupant.

By way of further explanation, the summate pressure within the inflatable member 22, upon the occurrence of a first force of impact of the occupant is expressed as P1. In terms of the pressures within the various chambers, the summate pressure P1 is more specifically postulated to be P1=(Pi)+(Pi-x)+((Pi-x)-(y))+((Pi-x)-(y)-(z))+E, where E represents the external force of acceleration of the occupant. The processor 20 arrives at P1, reads the difference between P1 and the pressure Pi, and incrementally adds the amount of the air needed to in-fill chambers D, E, and F, to meet and oppose this summate pressure, P1. This rapid inflation, followed by rapid deflation of the chambers D, E and F back to pressure Pi, restores the unit to base line to receive the next impact. That summate pressure information is then transmitted by the processor 20 to the opposing, cooperatively positioned inflatable member 24 (see FIG. 2), to provide an opposing force at least equal but not less than the previous opposing force and reduced by an increment to be determined, so that the summate pressure is not greater than the force impact of the occupant. As a result, a lower total summation pressure, P2 of the inflatable member 24 is provided as compared to P1 of the inflatable member 22. Repeated impacts will register successive summation pressures of alternating, interceptor inflatable members 22 and 24 as P3, P4, P5, etc. wherein each successive total summation pressure and opposition-corrective pressure will be successively lower than the preceding pressure, because of reduced inertia, active opposing pressure forces by the inflatable members 22, 24, and the coefficient of air friction, all coming into play.

Figure 4:
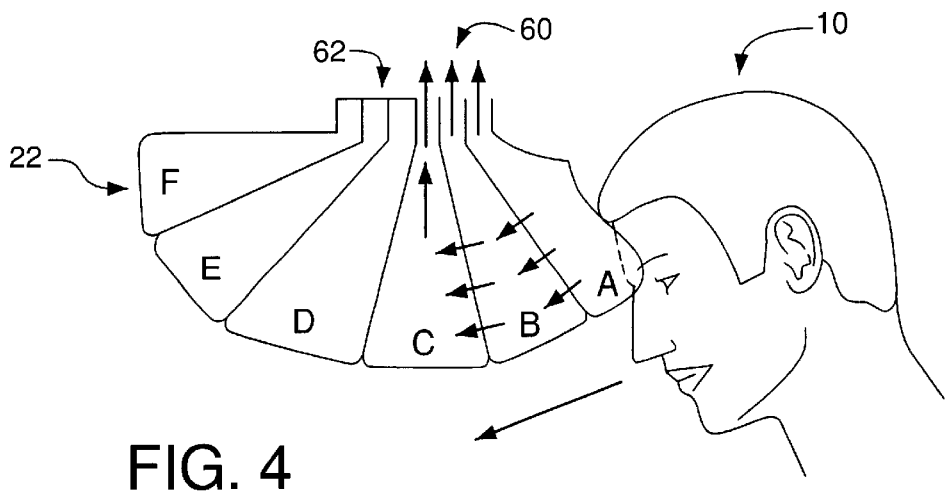
FIG. 4 is a schematic representation of the inflatable member of FIG. 3 and a forwardly directed impact caused by accelerated forces acting on the head and neck of an occupant.
Figure 5:
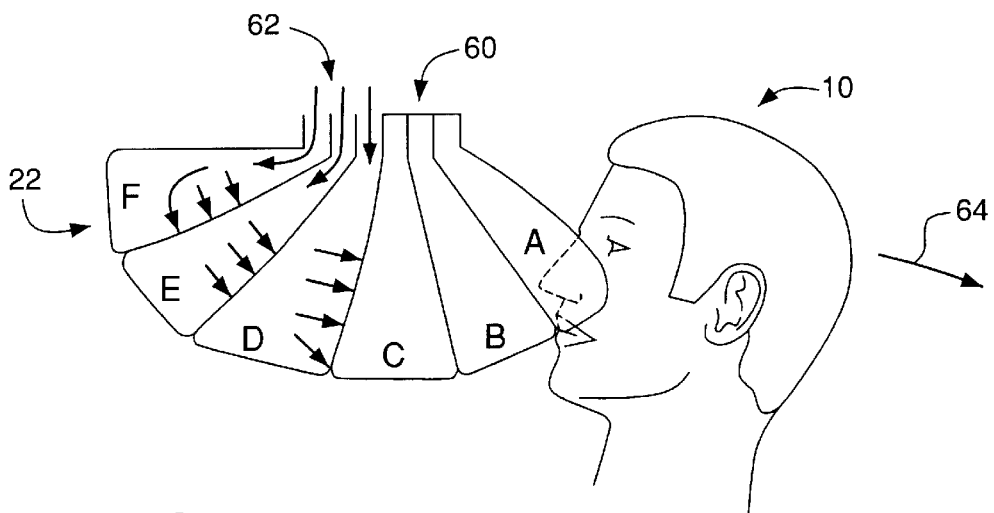
FIG. 5 is a schematic representation of the inflatable member of FIGS. 3 and 4 in another sequence corresponding to a rebounding movement of the occupant s head and neck in an opposite, rearward direction.

With reference to FIGS. 3, 4 and 5, the occupant 10 engages the inflatable member 22 at a first chamber A, which is the leading portion of the impact absorbing zone. The pressure in chambers A, B, and C begins to reduce through a transfer of air increment to create an equal and opposite force, but not a greater force than that of the force of impact of the occupant 10 engaging the inflatable member 22. A creation of a greater force is prohibited in that such an excessive force created in chambers D, E, and F would "re-accelerate" the head or other body part, possibly causing further damage or injury to the occupant 10 by rebounding in the opposite direction as indicated at 64.

When the two or more inflatable members 22 and 24 are working in cooperative relation to one another, in that they are substantially opposed as shown in FIGS. 2, the motion indicated as 64 will be a rebounding motion. The occupant will be intercepted by the second inflatable member 24, which will react in the same manner in terms of actively regulating or varying the pressure in the various chambers A, B, and C of the impact absorption zone, as well as the internal chambers D, E, and F, of the impact resistance zone as to provide a lesser summate pressure P2, set forth above. The rebounding force with which the occupant 10 engages the second inflatable member 24 will be calculated almost instantaneously by cooperative workings of the sensor assembly 46 and the processor 20 so as to regulate and determine the initial inflation pressure Pi of the chambers D, E, and F of the impact resistance zone of inflatable member 24 and based on the initial inflation pressure Pi, the pressure of the remaining internal chambers A, B, and C of the impact absorption zone will also be incrementally determined and adjusted such that absorption and resistance is accomplished in an optimum manner so as to reduce the motion of the occupant's head, or other body part to lesser oscillations.

As shown in FIGS. 6 and 7, one strategic location of at least one inflatable member 26 may be in an upper side corner within a compartment 26' above or adjacent to a door or window opening. When inflated in the manner shown in FIG. 7, the inflatable member 26 will be disposed adjacent to the window, so as to protect the occupant 10 from impacting the window or door.

Similarly, in FIGS. 8 and 9 an inflatable member 28, including the plurality of internal chambers as indicated above, may be mounted in its stored position within a door post 27 and, when inflated, may extend outwardly therefrom so as to protect the occupant 10 from engagement with the door post, window or other portions of the door and thereby reduce or eliminate lateral-flexion which causes the aforementioned injuries. In this manner, a resulting rotation of the occupant 10 as indicated by directional arrow 29 may also be eliminated by engagement with the deployed inflatable member 28.

Figure 10:
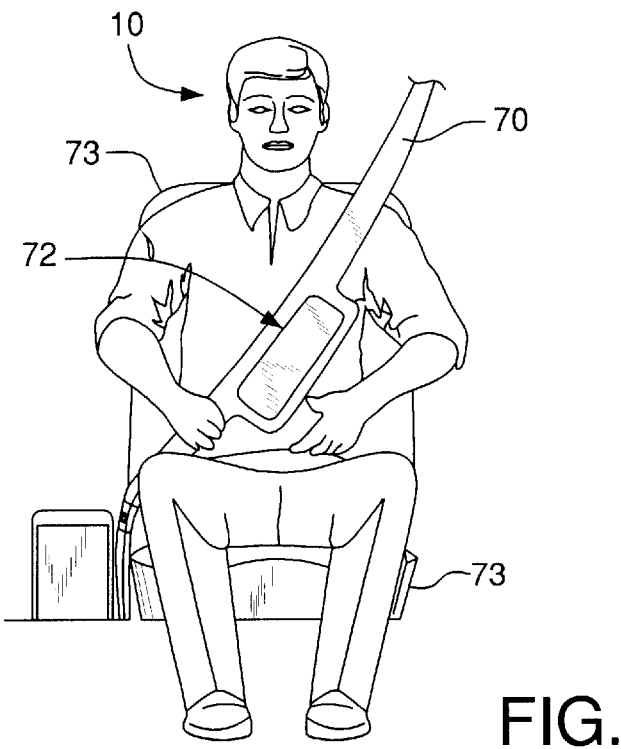
FIG. 10 is a front view of an inflatable member in accordance with the restraint assembly of the present invention mounted on a restraining harness.
Figure 11:
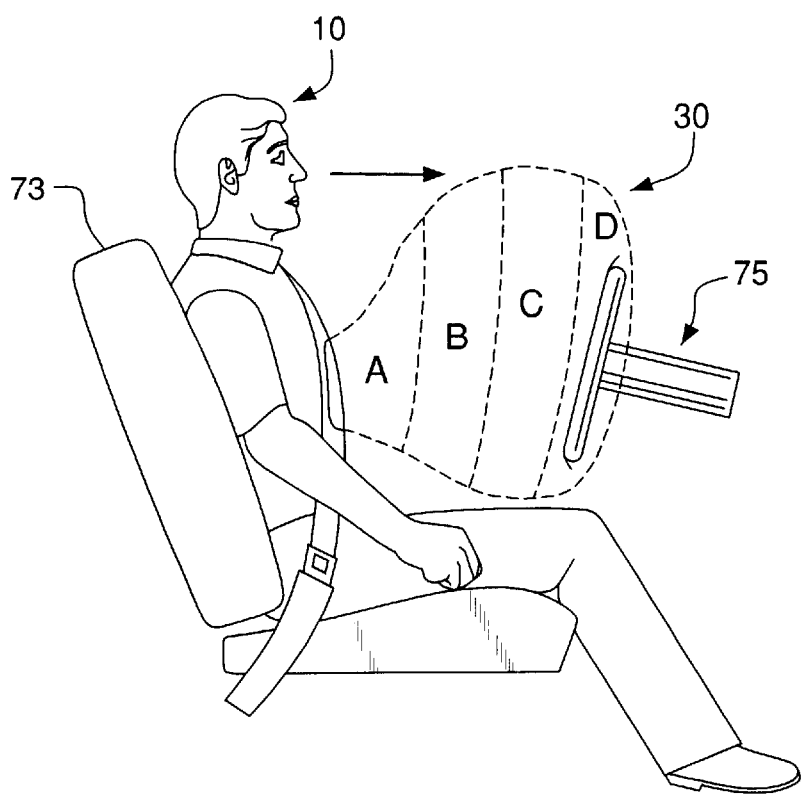
FIG. 11 is a side view of the embodiment of FIG. 10 shown partially in phantom lines indicating a deployment of the inflatable member.
Figure 12:
FIG. 12 is a front view of another embodiment of the present invention wherein at least one inflatable member is mounted on an auxiliary seat, such as a child's seat.

With reference to FIGS. 10 and 11, at least one of the inflatable members 30 may be mounted on a harness 70, which extends across the occupant's body in the conventional manner. The compartment 72 for the inflatable member 30 is mounted such that when deployed, the inflatable member 30 is projected outwardly, away from the occupant 10, when the occupant is in an intended position, such as a seat 73. The inflatable member 30 once deployed may engage the steering wheel or column generally indicated as 75 or other portions of the vehicle, dependent upon the location of the seat and the intended position of the occupant 10.

Figure 13:
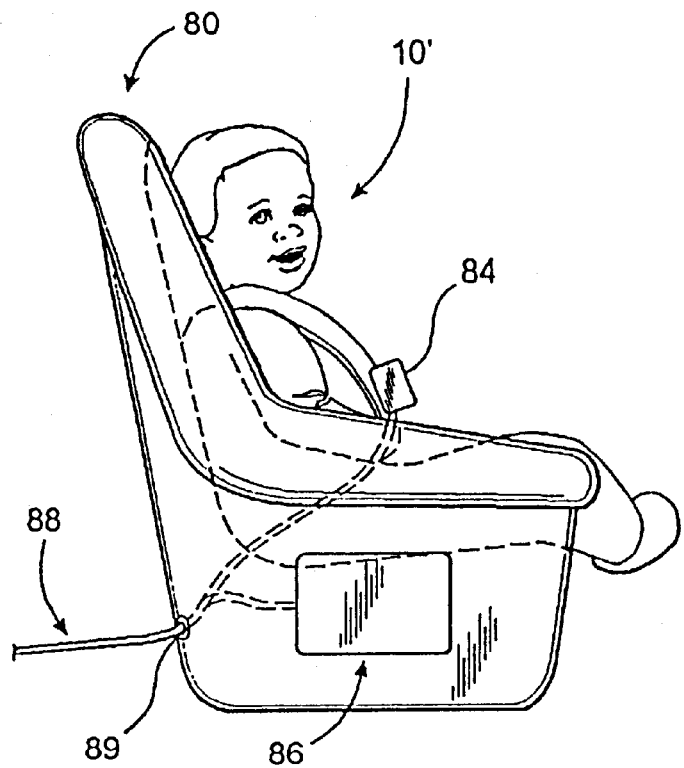
FIG. 13 is a side view of the embodiment of FIG. 12.
Figure 14:
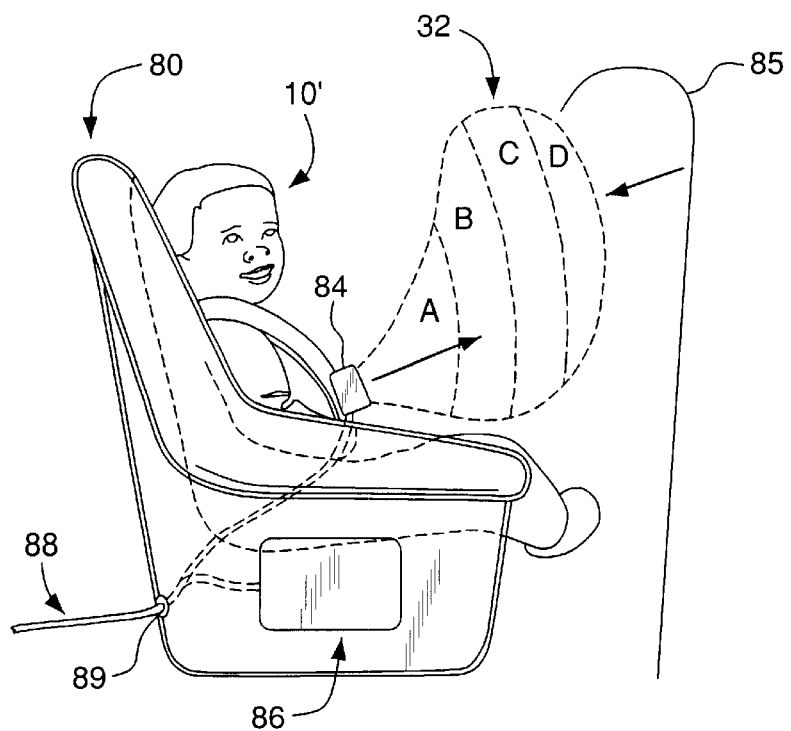
FIG. 14 is a side view of the embodiments of FIGS. 12 and 13 shown in partial phantom lines representing a deployment of the inflatable member.

With regard to FIGS. 12 through 15, the one or more inflatable members 32 and 34 can be mounted on and deployed directly from an auxiliary seat 80, which may be in the form of a child seat or other auxiliary seat. The inflatable member 32 can be stored within a harness or other component or portion of the auxiliary seat 80, as at 84, so that when it is deployed it extends outwardly away from the occupant 10', as shown in FIG. 14, into engagement with a seat back surface 75 or other portion of the vehicle, dependent upon the orientation and location of the auxiliary seat 80-. Similarly, a second or additional inflatable member 34 can be deployed outwardly from a side area, as at 86, of the auxiliary seat 80, into engagement with a side portion of the vehicle in order to prevent injury from a side impact of the vehicle.

Figure 15:
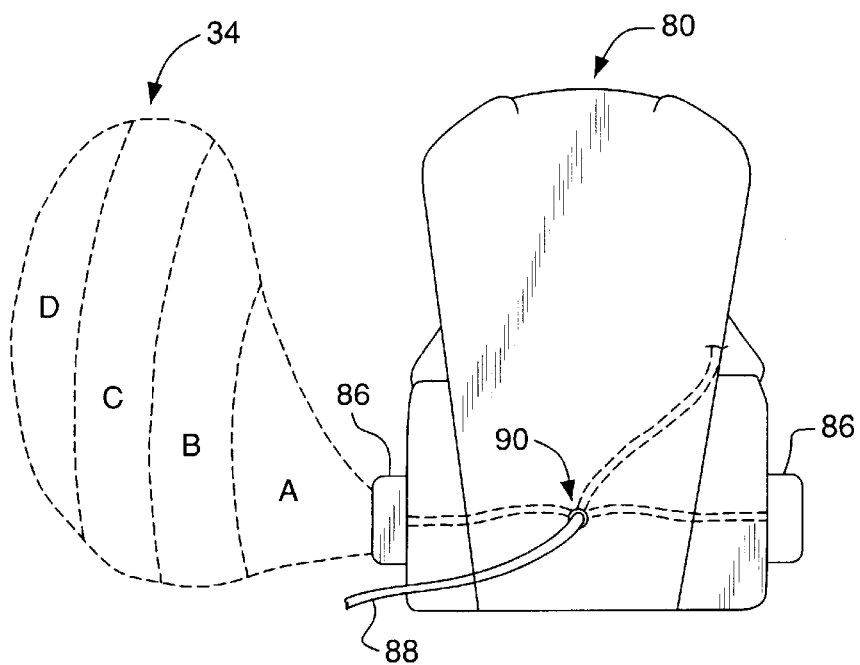
FIG. 15 is a rear view of the embodiment of FIGS. 12 through 14 showing a deployment of another inflatable member being mounted on the side of the auxiliary seat and represented in phantom lines in a deployed position.

FIGS. 13 and 15 also indicate that the inflatable members 32 and 34 may be electrically and/or pneumatically interconnected to the processor 20 and/or to one or more fluid sources of inflatable material, such as air, by a cord or cable assembly 88, running through appropriate mountings and/or apertures 89 and 90, formed on the auxiliary seat 80.

Yet additional preferred embodiments of the present invention are herein demonstrated in FIGS. 16 through 54. As described, the restraint assembly associated with these embodiments are disposed, dimensioned and structured to overcome the many different types of forces to which the human body of an occupant may be subjected when seated within a vehicle involved in an emergency condition. It is, therefore, again emphasized that some injuries to an occupant are due more to linear momentum and deceleration forces while others are due to angular momentums with deceleration forces. In addition to these forces, the occupants may be subjected to a combination of torque forces, centrifugal and centripetal forces, and "crunch" forces due to spinal loading. All of these forces are summated by the time appropriate ones of the plurality of inflatable members are deployed. Accordingly, most belt restraints and air bags, as known in the prior art, can do little but passively absorb the forces to which the body is subjected. When such summated forces are greater than the ability of the human body to tolerate, tissue deformation occurs with resultant injury.

As shown in the accompanying drawings, and with specific reference to FIGS. 16 through 24, it is schematically demonstrated that an occupant of the vehicle generally indicated as 100 and disposed in a seated position on vehicle seat 101 is exposed to forces during a collision of the vehicle from both the front 102 and the rear 106. As such, the spine of the occupant acts as a long lever with the fulcrum at the lumbar junction with the pelvis 104. The forces influencing the body of the occupant 100 causes the large angular momentum of the head on the spine with large anterior/posterior "whipping" action. Forces of linear acceleration are superimposed and summated with those of angular momentum and torque, wherein the linear forces are represented by the directional arrow 105. For purposes of reference, the occupant 100 is oriented to face in a forward direction 107 and is seated next to a side or window area 108.

With reference to FIGS. 18 and 19, the spine of the occupant 100 flexes laterally from side-to-side further serving to whip the head towards and away from the side window 108. This is the result of an impact from a lateral or side direction such as on the door or side panel 111 of the vehicle 112 as indicated in FIG. 18. The phantom lines of the occupants head indicates lateral hyperflexion from side-to-side.

FIGS. 20 and 21 represent schematic side and top views respectively for the purpose of demonstrating the reaction on the occupant 100 upon the occurrence of an emergency event or accident involving oblique impacts 116. Such oblique impacts introduce an element of torque-rotation to the head and spine superimposed on the large angular momentum forcing them into what may generally be referred to as a "conical" range of motion generally indicated as 114. As such, the direction of force from the oblique impacts 116 produce the conical range of motion, wherein the apex of the conical range is generally defined at the lumbosacral junction of the spine with the pelvis 104, as set forth above. The head of the occupant 100 is moved through an arc of angular momentum and again the forces are summated.

As will be explained in greater detail hereinafter, FIGS. 22 through 24 disclose various additional preferred embodiments of the restraint assembly of the present invention which are disposed, dimensioned, and configured for timely activation, by operation of the processor assembly 20 and operatively associated impact sensors as at 14. The various components of the restraint assembly, to be described, serve to protect the one or more occupants 100 from the various linear, angular or torque forces exerted on the body of the occupant 100, dependent upon the direction of impact on the vehicle involved in an emergency event or crash.

Figure 25:
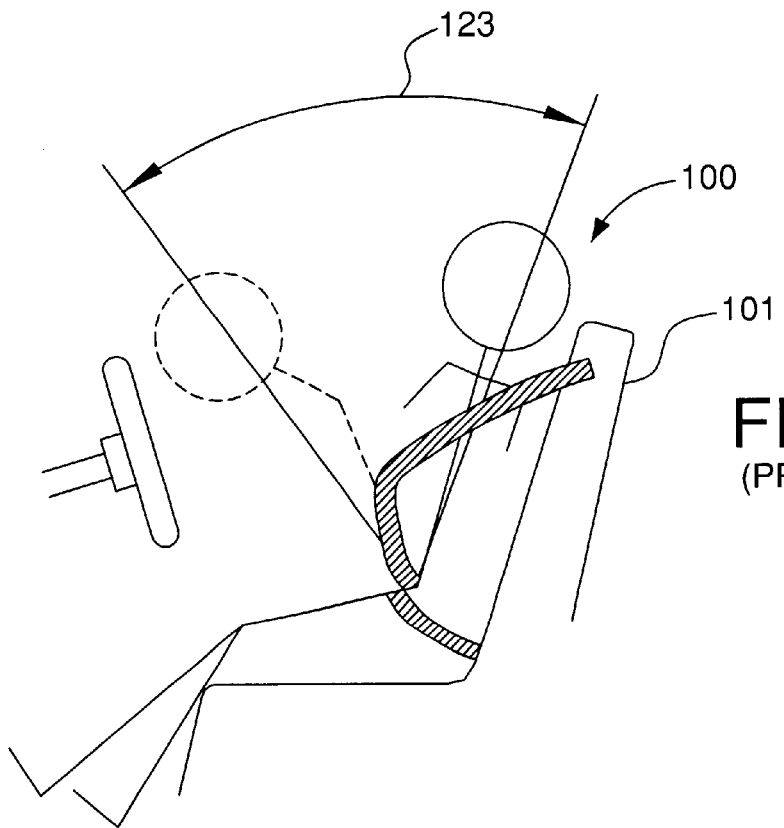
FIG. 25 is a side view in schematic form showing forces which are applied to the body in an emergency condition including impacting the vehicle in which an occupant is riding.
Figure 26:
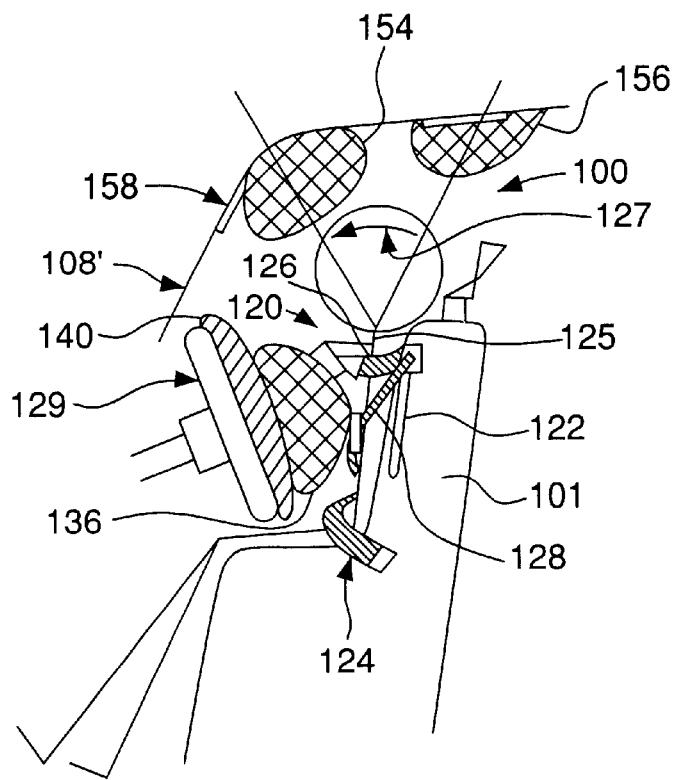
FIG. 26 is a side view in schematic form of another preferred embodiment of the restraint assembly of the present invention protecting the occupants body from the forces as explained with reference to FIG. 25.

Accordingly, as shown in FIGS. 25 through 33 the restraint assembly of the present invention comprises a restraining harness generally indicated as 120 secured to a vehicle seat 101, at least in part, by a mounting assembly generally indicated as 122, to be described in greater detail hereinafter. FIGS. 25 and 26 further demonstrate that the long lever defined by the length of the spine, provides an extended whipping action resulting in large angular forces of deceleration superimposed on linear forces of deceleration. The summation of these forces of course increases the high tendency of trauma or fatality. The increased magnitude of such forces is indicated by the extended forced movement 123 of the occupant 100 in the event that an inadequate restraining harness was used instead of the restraining harness 120 of the present invention. However, using the restraint harness 120 of the present invention and further incorporating a plurality of globally disposed inflatable members, all actuated on a timely basis by the processor assembly 20, the fulcrum of motion is located as the base of the neck 125, resulting in a significantly decreased arc of angular momentum 127.

This reduced angular momentum is directly attributable to the structuring of the restraint harness 120 which includes a lap belt segment 124, an upper chest belt segment 126 and a diagonal belt segment 128 which deploys away from the body to reduce risk of injury. Therefore, the restraint harness comprising these cooperatively structured and combined belt segments result in a protection of the occupant 100 in a manner which significantly reduces the angular momentum, as at 127, as well as any torque forces of the head on the neck and of the chest due to a twisting action, again dependent on the direction of impact. For purposes of orientation the occupant 100 is facing towards the front windshield 108' and in FIG. 26 is represented as an operator or driver of the vehicle positioned in front of the steering wheel generally indicated as 129. Therefore, the restraining harness assembly 120 and specifically the positioning and operation of the diagonal belt segment 128 reduces lateral flexion of the spine and reduces lateral and rotational momentum towards the side window 108 and the door post 109. Impact forces are further reduced and opposed by a plurality of the other inflatable members to be described in greater detail hereinafter.

Figure 27:
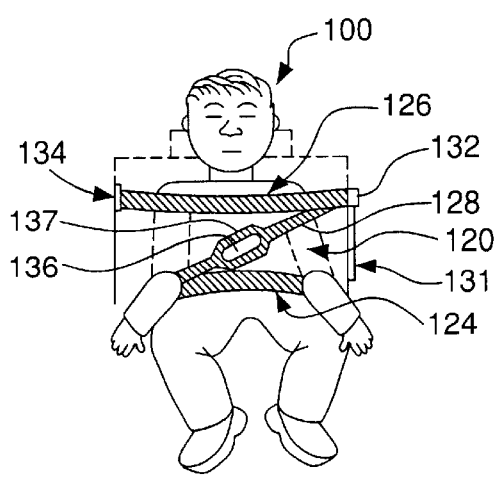
FIG. 27 is a front view of another preferred embodiment of the restraint assembly of the present invention including a restraint harness.
Figure 29:
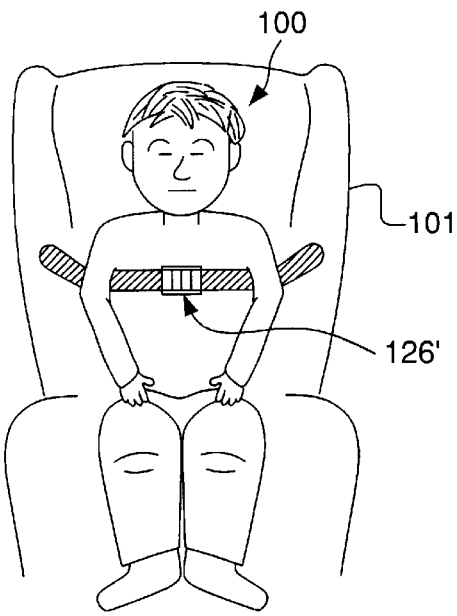
FIG. 29 is a front view of yet another preferred embodiment of the restraint assembly of the present invention.
Figure 28:
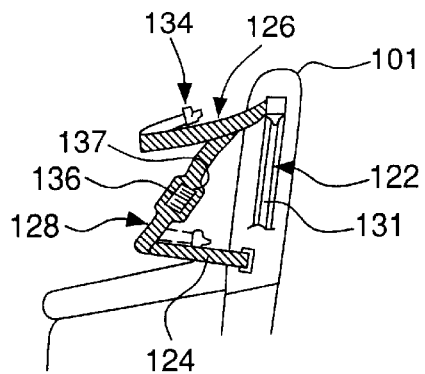
FIG. 28 is a side view of the embodiment of FIG. 27.
Figure 30:
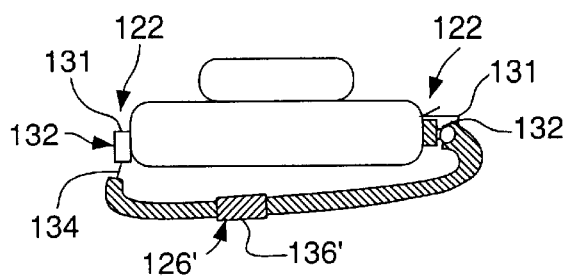
FIG. 30 is a top view of the embodiment of FIG. 29.

With further reference to FIGS. 27 through 33, the restraining harness 120 of the present invention comprises the aforementioned belt segments 124, 126 and 128. As best shown in FIGS. 27 and 28, (as well as FIG. 53), the belt segments are collectively oriented or disposed in a substantially "Z-shape" configuration when in their operative, restraining position. In particular, FIGS. 29 and 30, show details of the chest belt segment 126' disposable in overlying relation initially or preferably to the upper chest area of the occupant 100 so as to fit beneath the occupant's arms and underneath the shoulders. Opposite ends of the chest belt segment 126, 126' are connected to opposite or corresponding sides of the seat 101 in both the embodiments of FIGS. 27 and 29 by virtue of the aforementioned mounting assembly 122. The mounting assembly 122 comprises an elongated track 131, wherein each opposite end of the chest belt segment 126 includes an appropriately configured anchor member 132 of the type shown in FIG. 31. The anchor member 132 is selectively positionable along the length of the track 131 and lockable, by interaction between the track 131 and the anchor member 132 into the selected position along the length of the track 131. Both sides of the seat 101 include an attachment of the mounting assembly 122 thereto, including the elongated tracks 131.

In addition, the chest belt 126 and/or 126' has a buckle member as at 134 secured to at least one end thereof so as to facilitate removable attachment of the chest belt 126, 126' in the aforementioned overlying relation to at least the frontal area of the occupant 100. Accordingly, the anchor member 132 may be attached or connected to the belt buckle such that both the belt buckle and the anchor member are movable along the length of the corresponding track 131. The adjustability of the chest belt 126 is for purposes of accommodating occupants 100 of varying sizes ranging from children to large adults, while still providing the needed protection. Therefore, the aforementioned Z-shape configuration of the belt segments 124, 126 and 128 is more specifically define by the chest belt 126 and the lap belt 124 being disposed in somewhat horizontal orientation, respectively overlying the chest and lap portions of an occupant. In cooperation therewith, the diagonal belt 128 extends from generally one end of the chest belt 126, with which it may be connected, diagonally across the occupant to an oppositely disposed end of the lap belt 124.

Another preferred embodiment associated with the restraining harness 120 is the provision of at least one inflatable member 136 mounted thereon. In the embodiments of FIGS. 27 and 28, the inflatable member 136 is mounted, in a stored position, within a chamber or like structure 137. However, when inflated, as shown in FIG. 26 the inflatable member 136 is disposed and structured to extend outwardly away from the harness 120 and also away from the frontal area of the occupant 100. The one inflatable member 136 is further disposed in aligned relation to the steering wheel 129.

Accordingly, an additional inflatable member 140 may be mounted on the steering wheel 129 and the inflatable members 136 and 140 are cooperatively disposed and structured to be forced into confronting relation to one another to further reduce the angular momentum 127 upon the occurrence of an emergency event, as described above. The details of the inflatable member 140 will be discussed at greater length with regard to FIGS. 46 through 48.

In addition to the above, yet another feature of the present invention is the provision of the one inflatable member, herein designated 136' located within the chest belt 126', as disclosed in FIG. 29. As with the embodiment of FIG. 27, the activation of the inflatable member 136' is such that it extends outwardly into an operative orientation away from the chest belt segment 126' and the occupant 100 so as to engage a frontal portion of the automobile when the occupant 100 is not the driver. Naturally, as with the embodiment of FIG. 26, the inflatable member 136' when inflated into its operative orientation, confrontingly engages and cooperates with the steering wheel inflatable member 140 as described.

Figure 32:
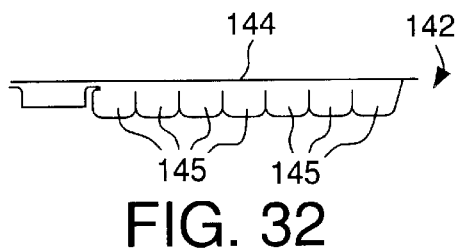
FIG. 32 is a top view of one or more belt segment structures associated with the restraining harness of the embodiments of FIGS. 27 through 30.
Figure 31:
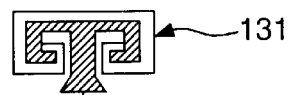
FIG. 31 is a detailed view in section showing a mounting assembly associated with the restraint assembly of the embodiments of FIGS. 27 through 30.
Figure 33:
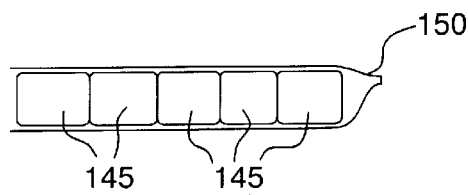
FIG. 33 is a front view of the embodiment of FIG. 32.
Figure 40:
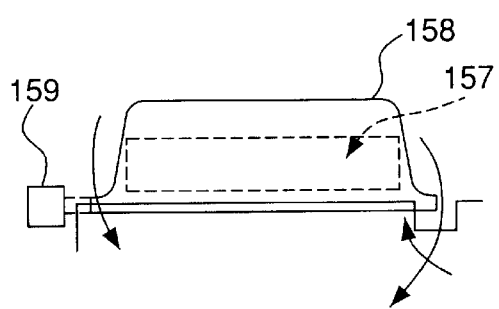
FIG. 40 is a front view of an interior of a vehicle showing the stored location of one of a plurality of inflatable members included in the restraint assembly of the present invention.

With reference to FIGS. 32 and 33, both the embodiments of FIGS. 27 and 29 may also include additional structural features which facilitate the comfort and safety of the occupant 100 and eliminate any type of exposure or trauma to the chest, neck or other portions of the user's body. As emphasized, injury and trauma are reduced through the reduction of deceleration/momentum of upper body forward motion, thereby reducing deceleration of the head and neck. To accomplish this, one or more of the belt segments 124, 126, 126' and 128 may include an inflatable section generally indicated as 142. The inflatable section 142 extends outwardly from the surface 144 which confronts the occupant (not shown) and may comprise at least one, but preferably, a plurality of inflatable air chambers 145 of sufficiently reduced dimension to be mounted on one or more of the belt segments. The air chambers 145 are disposed substantially on the interior of the various belt segments, collectively indicated as 150 in FIG. 33 for purposes of clarity. The one or more air chambers 145 are inflatable upon a sensing assembly 14 determining the existence of an emergency event or impact and also substantially concurrently to the inflation of the remaining inflatable members of which the restraining assembly of the present invention is at least partially comprised.

With reference to FIGS. 34 through 39, yet another preferred embodiment of the present invention comprises structural modifications of the harness assembly 120, and more specifically, the chest belt segment 126, 126'. In situations where the inflatable member 136 is mounted in the diagonal belt segment 128, the chest belt segment 126, 126' may include an additional inflatable member generally indicated as 142. The inflatable member 142 is mounted within an area or compartment 144 having a removable cover member 143. The cover member 143 is disposed in covering or closing relation to the chamber 144 when the inflatable member 142 is in its stored position. As stored, the inflatable member 142 includes two outwardly extending lateral or end portions 145 disposed in folded or overlapping relation to a central portion 146. The lateral or end portions 145 are folded into the overlapped position along designated fold lines 147 and 147' as indicated in FIGS. 37 and 38. The cover member 143 may pivot outwardly or be displaced in any other applicable direction relative to connection 143' in order to allow the inflatable member 142 to extend outwardly from the chamber 144 into an inflated, operational orientation as shown in FIGS. 36 through 39.

First, and with reference to FIG. 36, upon activation, the closure 143 is opened or displaced and the inflatable member 142 extends outwardly into its inflated, operable orientation. As shown in FIG. 37, the inflatable member 142 is such as to extend in front of the neck or throat area 100' of the occupant 100 immediately beneath the chin area 149. Further, the lateral or end portions 145 are dimensioned, configured and disposed relative to the central portion 146 to extend in overlying, protective relation to opposite sides of the throat or neck, as clearly demonstrated in FIGS. 37 through 39. Accordingly, when in its fully inflated position the throat and sides of the neck are completely protected as the inflatable member 142 wraps laterally around the throat and neck to reduce both forward and side flexion forces of the head on the neck. In order to accomplish the proper deployment and orientation of the inflatable member 142 when in its fully extended, operational orientation, the inflatable member 142 may be formed of a plurality of internal chambers which are concurrently inflated such that the inflatable member 142 assumes its protective position almost instantaneously.

As set forth above, additional preferred embodiments of the restraining assembly of the present invention comprise the global positioning, relative to the occupants and the interior of the vehicle, of the plurality of inflatable members. With reference to FIGS. 41 through 44, such inflatable members may include ceiling members mounted on the upper portion of the vehicle adjacent the ceiling and in a variety of different locations. At least some of the locations of the ceiling members, is the provision of cooperatively disposed anterior and posterior members designed to restrict motion and momentum of both the front portion and the rear portion of an occupants head. The ceiling members are disposed and structured to cooperate with others of the plurality of inflatable members, as well as the restraining harness, but also independently thereof if desired.

Figure 41:
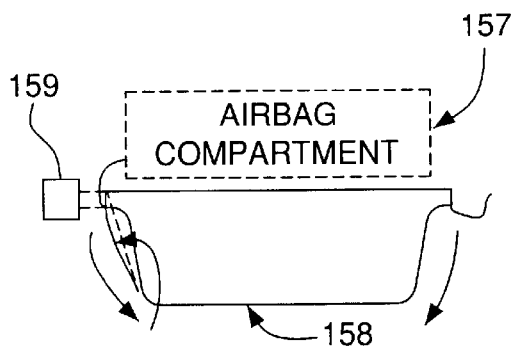
FIG. 41 is a front view of the embodiment of FIG. 40 in a different position.
Figure 42:
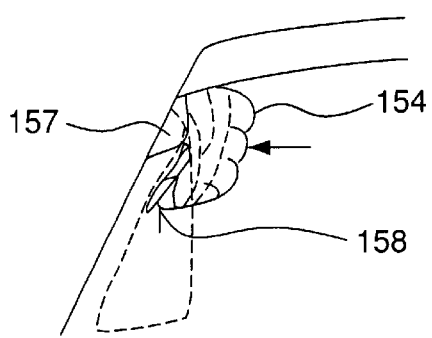
FIG. 42 is a side view in partial cutaway of the deployment of the inflatable member associated with the embodiment of FIGS. 40 and 41.
Figure 43:
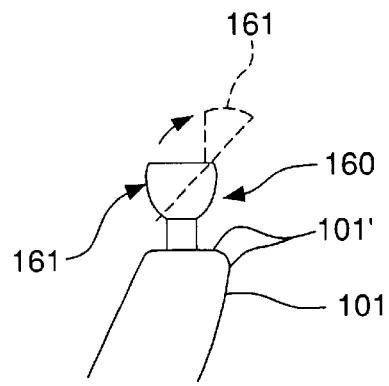
FIG. 43 is a side view in partial cutaway and phantom of another preferred embodiment of the restraint assembly of the present invention.
Figure 44:
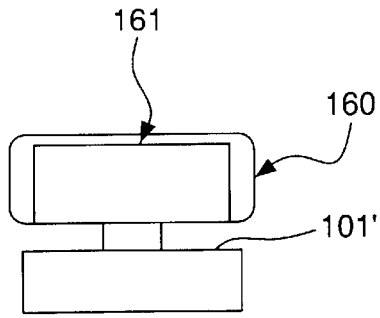
FIG. 44 is a front view of the embodiment of FIG. 43.

As shown in FIG. 26, the ceiling members include the anterior ceiling member 154 and the posterior ceiling member 156. The anterior ceiling member 154 is preferably mounted, in at least one embodiment of the present invention, in a compartment 157 located adjacent to and preferably behind the sun visor or like structure 158 as best shown in FIGS. 41 through 42. When activated into an inflated, operational orientation, the sun visor 158 is forced downwardly, either by the outwardly directed force of the inflatable anterior member 154 or by activation of a drive motor 159. In either case, upon activation of the anterior ceiling member 154 the sun visor 158 is forced downwardly in accordance with the directional arrows indicating the position of FIG. 41. The inflatable anterior ceiling member 154 will be deployed outwardly as shown in FIG. 42 to engage the frontal area of the head and face of the occupant 100. Also, the visor 158, in at least one embodiment, will serve as a support foundation or the like, and offer adequate or applicable resistance to the outwardly extended operational orientation, when inflated, of the inflatable member 154.

Figure 45:
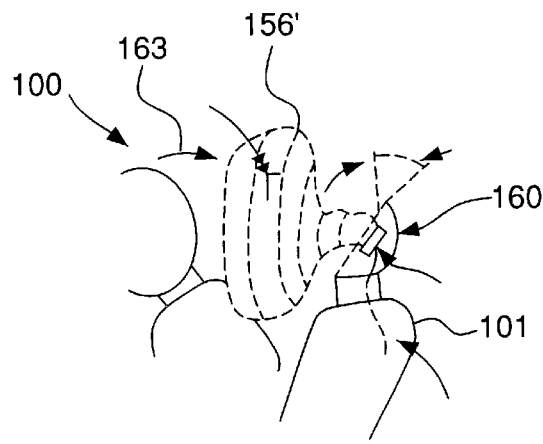
FIG. 45 is a side view of the embodiment of FIG. 43 with an inflatable member in at least a partially deployed operative orientation.

In addition, and in cooperation therewith the inflatable posterior member 156, when not located in the ceiling structure as indicated in FIG. 26, may in fact be located in a head rest, generally indicated as 160 and mounted on the upper peripheral portion or end of the car seat 101 as at 101'. With primary reference to FIGS. 43 through 45, the head rest 160 may include an interior chamber and a padded or cushioned cover member 161 disposed in overlying, closing relation thereto. As shown in FIG. 45 the cover member 161 is movable, upon activation of the inflatable member 156' from the closed position to the open position. Upon opening, and upon inflation the inflatable member 156' will extend outwardly away from the head rest 160 so as to engage and protect as well as absorb forces from a deceleration 163 of the head of the occupant 100 as best shown in FIG. 45.

Figure 46:
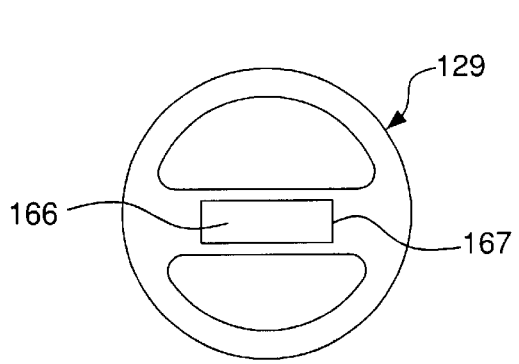
FIG. 46 is a front view of a steering wheel associated with a vehicle in which the restraint assembly of the present invention is located.
Figure 47:
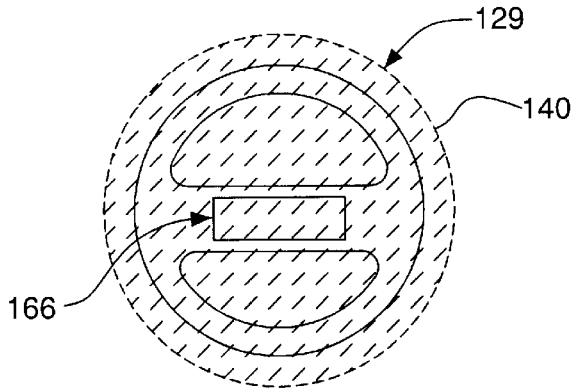
FIG. 47 is a front view of an inflatable member associated with the steering wheel of FIG. 6 disposed in an at least partially deployed, operative orientation.
Figure 48:
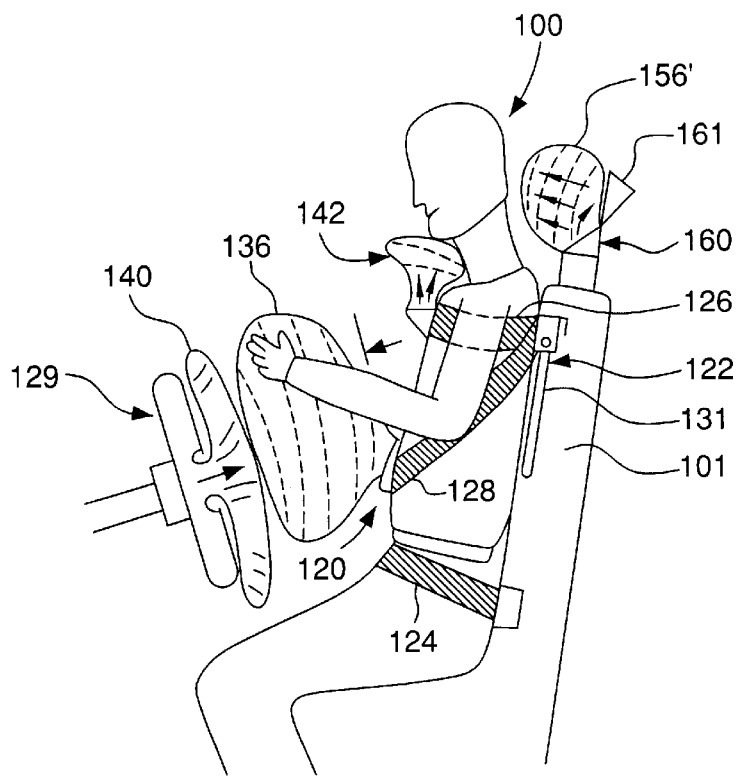
FIG. 48 is a side view of the relative positions of cooperatively disposed and activated inflatable members associated with the restraint assembly of the present invention.
Figure 49:
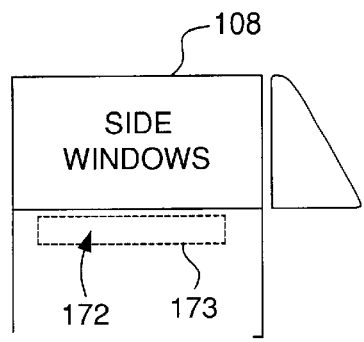
FIG. 49 is a front view of an interior side window of a vehicle adjacent which the restraint assembly of the present invention is mounted.
Figure 50:
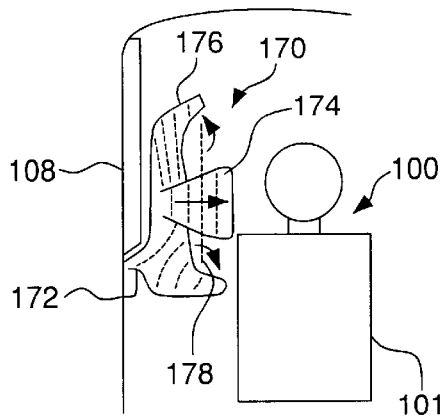
FIG. 50 is a rear view of the embodiment of FIG. 49 with an inflatable member deployed in an operative orientation.
Figure 51:
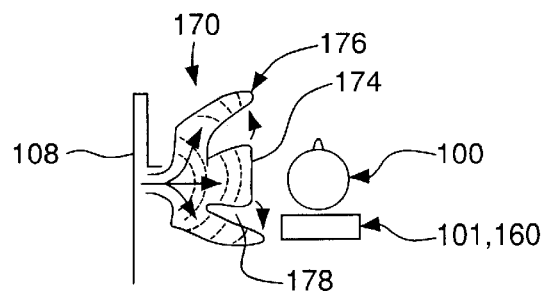
FIG. 51 is a top view of the embodiment of FIG. 50.
Figure 52:
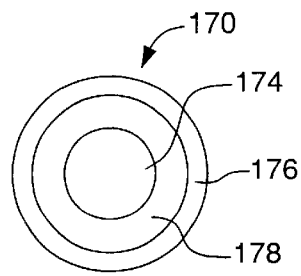
FIG. 52 is a front view of the inflatable member of the embodiment of FIGS. 50 an 51.
Figure 53:
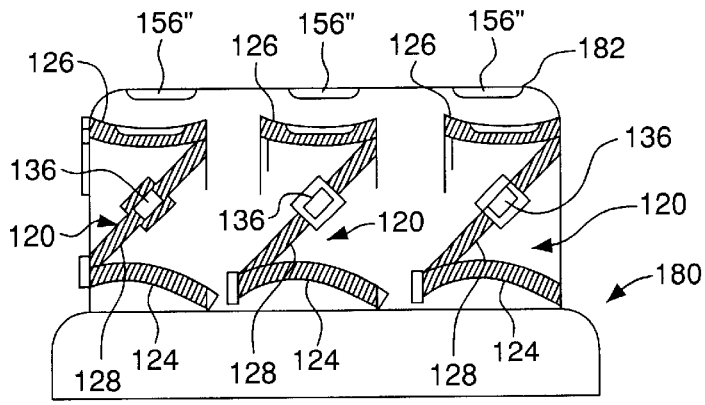
FIG. 53 is a front view of yet another preferred embodiment of the restraint assembly of the present invention.
Figure 54:
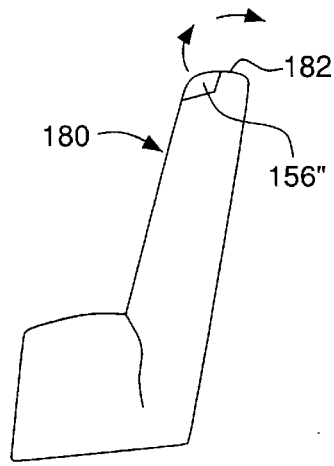
FIG. 54 is a side view of the embodiment of FIG. 53.

With primary reference to FIGS. 46 through 48 and as set forth above, the plurality of inflatable members of the restraining assembly of the present invention further comprises a steering wheel member 140. The steering wheel member 140 is located, when in its stored position, within a chamber 166 having an appropriate cover or lid 167. When activated, the inflatable steering wheel member 140 extends outwardly from the exposed face of the steering wheel 129 through an opening in the retaining chamber or compartment 166 and after the closure 167 has been displaced from its covering position. As best shown in FIGS. 47 and 48 the steering wheel inflatable member 140 preferably comprises a flat, somewhat circular or round configuration. Moreover, the diameter or transverse dimension of the inflatable steering wheel member 140 is somewhat greater than that of the steering wheel 129. This will prevent the occupant 100 from impacting with any portion of the steering wheel 129. Also, the substantially flat configuration of the steering wheel member 140 preferably is defined by a depth or width of approximately 2 to 3 inches. This of course significantly differs from prior art air bags which issue from the steering wheel.

The flattened configuration of somewhat limited width or depth, as set forth above, is permissible since the steering wheel member 140 is designed to cooperate with and confrontingly engage the inflatable member 136 which extends outwardly from the restraining harness 120. The inflatable member 136 is disposed in aligned, confronting relation to the steering wheel member 140, whether the member 136 is extended outwardly from the diagonal belt segment 128 or the chest belt segment 126. Therefore, the purpose of the steering wheel member 140 and its cooperative relation to the inflatable member 136, associated with the harness assembly 120, is to reduce risk of blunt trauma to the chest and abdomen, or other frontal area portions of the occupant 100 by acting as a buffer between the occupant 100 and the steering wheel 129. It is important to note that one feature of the present invention is the outward extension of the inflatable member 136 away from the harness assembly 120 and also away from the frontal area of the occupant 100. Therefore the steering wheel member 140 and the harness inflatable member 136 cooperatively oppose, in summation effect, the angular momentum of the head/neck/body due to deceleration, reducing the impact forces on the chest, abdomen, and other frontal area portions of the occupant 100.

With reference to FIGS. 49 through 52, yet another preferred embodiment of the present invention comprises the plurality of inflatable members, being activated through operation of the CPU or processor assembly 20, as set forth above and further including a side or window inflatable member generally indicated as 170. The inflatable member 170 is disposed above or beneath or otherwise substantially adjacent to the window or side portion 108. As such, when in its stored position, the inflatable member 170 is disposed within a compartment 172 having an appropriate closure or cover member 173. Once activated, the inflatable member 170 issues from the chamber 172 once the cover 173 has been displaced.

The dimension, configuration and disposition of the inflatable member 170 is such that it protects the side, head, neck, etc. against side injuries due to lateral flexion/rotation of the occupants body. In order to accomplish this, and as best in shown in FIG. 52, the inflatable member 170 has a sectional or a segmented construction. The segmented structure includes a central portion 174 which extends outwardly into an operational orientation when inflated so as to engage primarily the head area or lateral portion of the head. In addition, the inflatable member 170 includes an outer, substantially surrounding peripheral portion 176 disposed in spaced relation to the central portion 174, wherein the separating space 178 also has a substantially annular configuration. Accordingly, it is readily apparent that the inflatable member 170 is somewhat dish-shaped and generally similar to a round shield-like structure. As such, the central portion 174 provides extra protection or buffering against side impacts of the vehicle. The surrounding peripheral portion 176 folds in overlapping relation to the central portion 174 in accordance with the provision of a plurality of fold lines or creases appropriately formed on the inflatable member 170. The folding, overlapping relation of the various parts 174 and 176 relative to each other and to the open surrounding space 178 is of course accomplished when the inflatable member 170 is in its stored position, as set forth above.

Yet an additional feature of the present invention is the structural adaption of a plurality of the embodiments, as set forth above, to a vehicle seat 180 which may be considered a rear seat or be located within the vehicle at various locations depending on the size and capacity of the vehicle. As such, the seat 180 includes a plurality of seat locations. Each seat location is equipped with a harness assembly 120 and is disposed in association with appropriately disposed inflatable members 136. As with the embodiment of FIGS. 27 and 28, each of the restraining harness assembly 120 of each seat location comprises the lap belt segment 124, the chest belt segment 126 and the diagonal belt segment 128 collectively oriented or dispose in the aforementioned "Z-shape" configuration, wherein the lap and seat belts 124 and 126 are substantially horizontally oriented and the diagonal belt segment 28 extends from one end 126 diagonally across the area to be occupied by a passenger to an opposite end of the lap belt segment 124. In addition, the inflatable members may include a posterior member 156" mounted, when in its stored position, in a head rest built in to an upper portion of the seat as at 182.

Again with reference, to FIGS. 22 through 24, the plurality of inflatable members which define the restraint assembly of the present invention further includes a side member 113. The side member 113, when in a stored position is disposed in an appropriately located chamber and positioned substantially adjacent the outer shoulder of an occupant 100. Upon the occurrence of an emergency event the side member extends outwardly into engagement with a shoulder, arm or other lateral portion of the occupant 100 to further protect against trauma and provide a buffer against side and/or oblique type impact.

It is again emphasized that in the most preferred embodiments the plurality of inflatable members are each connected to some type of fluid source and are cooperatively structured therewith so as to be almost instantaneously activated and thereby inflated outwardly or in the indicated direction into an operational orientation so as to protect the one or more occupants within the vehicle. Further, the fluid source, and at least some of the inflatable members are controlled in the most preferred embodiments by the aforementioned processor assembly 20, which is responsive to the one or more impact sensors 14, as well as the valve assembly and pressure sensor assembly 46 described in detail with regard to FIGS. 1 through 15. The infilling pressure generated by the inventive assembly is ideally determined generally by the weight of at least a person's head and speed of the vehicle, which are inputted and/or monitored by the computer processor and communicatively integrated within the assembly, such that it is structured to initiate a safe in-filling of fluid to respond to injury forces without being the cause itself of injury forces, thus providing an "intelligent" instantaneous computerized response.

Figure 55:
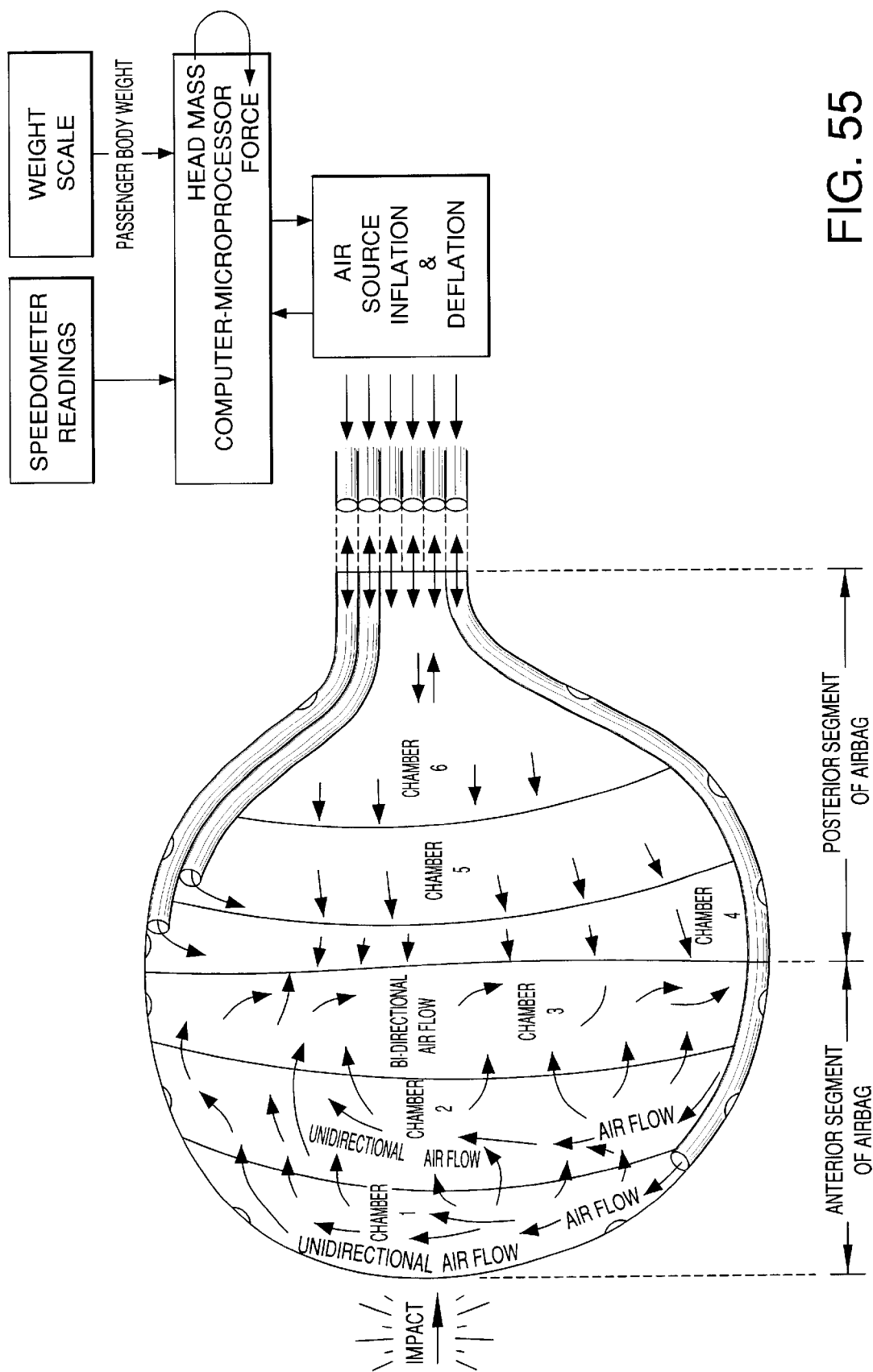
FIG. 55 is a schematic representation of yet another preferred embodiment of the present invention relating to operational and structural features of at least one of the plurality of inflatable members of the restraint assembly of the present invention and its association with a controlling/regulating, computer/microprocessor.

With reference to FIG. 55, yet an additional preferred embodiment of the present invention relates to an alternate construction and operation of at least one of the plurality of inflatable members associated with the restraining assembly of the present invention. The in-filling dynamics of the air bag as shown in FIG. 55 is regulated, at least in part, by a computer/microprocessor and various sensor assemblies that may be strategically mounted on or otherwise associated with the vehicle. However, and as also shown in FIG. 55 the indicated computer/microprocessor takes into consideration the speed of the vehicle at the time of an accident or impact and processes such data along with physical characteristics of the occupant or passenger. Such physical characteristics include the weight of the occupant which in turn may be determinative of the mass/weight of the occupant's head. Further, this embodiment may include the provision of some type of weight scale, preferably associated with the vehicle itself. The weight scale as well as other sensor assemblies, such as those shown in FIG. 55, may communicate directly with the computer/microprocessor. Therefore pertinent data is associated and processed such as, but not limited to, the speed of the vehicle, the weight of the passenger and the mass/weight of the passenger's head. This data, once properly processed will in turn be at least partially determinative of the in-filling dynamics of the one or more inflatable members, of the type shown in FIG. 55 being regulated by the computer/microprocessor and the data received from one or more of the associated sensor assemblies as disclosed.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A restraint assembly for a motor vehicle, said restraint assembly comprising:
   a) a harness secured to a seat within the vehicle and positionable into and out of an occupant restraining position,
   b) said harness including a plurality of belt segments disposable in spaced relation to one another,
   c) at least one of said belt segments including a first inflatable member connected thereto and disposed and structured to be extendable outwardly from the harness when inflated,
   d) said harness comprising at least a second inflatable member connected thereto and disposed and structured to extend into protective relation to an occupant's neck area when inflated into an operative position, and
   e) said second inflatable member being mounted on another of said plurality of belt segments and being dimensioned and configured to extend beneath a chin and laterally around opposite sides of the neck of the occupant when inflated.

2. A restraint assembly as recited in claim 1 wherein at least one of said belt segments is adjustably positionable in a substantially vertical direction along a back rest portion of the seat.

3. A restraint assembly as recited in claim 2 wherein said adjustable belt segment is disposed in a substantially horizontal orientation when in said occupant restraining position.

4. A restraint assembly for a motor vehicle, comprising:
   a) a plurality of inflatable members mounted on the vehicle and collectively positioned in an occupant restraining orientation,
   b) a fluid source connected to said plurality of inflatable members,
   c) each of said inflatable members cooperatively structured with said fluid source to inflate into an operative orientation upon the occurrence of an emergency condition,
   d) a pressure sensing assembly disposed to sense pressure of at least some of said plurality of inflatable members, and
   e) a processor operatively connected to said pressure sensing assembly and said fluid source, wherein said processor regulates pressure within at least some of said plurality of inflatable members in response to the emergency condition.

5. A restraint assembly as recited in claim 4 wherein said plurality of inflatable members include at least two ceiling members disposed in an anterior and posterior location relative to a seat of the motor vehicle.

6. A restraint assembly as recited in claim 5 wherein said two ceiling members are actuated substantially concurrently and are cooperatively structured to reduce linear and angular momentum of a head of an occupant caused by the emergency condition.

7. A restraint assembly as recited in claim 6 wherein one of said two ceiling members is disposed in a stored position substantially behind a sun visor and extends outwardly therefrom when inflated into said operative orientation.

8. A restraint assembly as recited in claim 7 wherein said one ceiling member forces a downward positioning of the sun visor when inflated into said operative orientation.

9. A restraint assembly as recited in claim 4 wherein said plurality of inflatable members include at least one window member mounted adjacent a vehicle window, said window member extending inwardly toward a seat of the vehicle when inflated into said operative orientation.

10. A restraint assembly as recited in claim 9 wherein said window member comprises a substantially round configuration and includes a central portion and a peripheral portion disposed in surrounding relation to said central portion and in spaced relation thereto.

11. A restraint assembly as recited in claim 4 wherein said plurality of inflatable members include at least one head rest member connected to a seat head rest when in a stored position and extendable outwardly from the seat headrest when inflated into said operative orientation.

12. A restraint assembly as recited in claim 4 wherein said plurality of inflatable members include a steering wheel member mounted on a steering wheel of the vehicle when in a stored position and extendable outwardly therefrom when inflated into said operative orientation.

13. A restraint assembly as recited in claim 12 wherein said steering wheel member comprises a substantially round, flat configuration having a diameter larger than that of the steering wheel.

14. A restraint assembly as recited in clam 13 wherein said steering wheel member is disposed in substantially aligned relation with a diagonal belt segment of a restraining harness.

15. A restraint assembly as recited in claim 14 wherein said plurality of inflatable members comprises a central member extendable outwardly from the diagonal belt segment and into confronting relation with the steering wheel member when both of the steering wheel member and the central member are inflated into said operative orientation.

16. A restraint assembly as recited in claim 14 wherein said plurality of inflatable members include at least one side member mounted on a side of the vehicle when in a stored position, said side member extendable outwardly from the side of the vehicle towards a seat of the vehicle when inflated into said operative orientation.

17. A restraint assembly for a motor vehicle, said restraint assembly comprising:
   a) a harness secured to a seat within the vehicle and positionable into and out of an occupant restraining position,
   b) said harness including a lap belt segment and a chest belt segment disposed in spaced relation to one another,
   c) a diagonal belt segment extending from generally one end of said chest belt segment diagonally between said chest belt segment and said lap belt segment to a generally oppositely disposed end of said lap segment, and
   d) said lap belt segment, said chest belt segment and said diagonal belt segment collectively disposed in a substantially Z-shape configuration when oriented in said occupant restraining position.

18. A restraint assembly as recited in claim 17 further comprising at least one inflatable member mounted on said harness and including a fluid source disposed in communication therewith, said inflatable member cooperatively structured with said fluid source to inflate into an operative orientation protective of an occupant upon the occurrence of an emergency condition.

19. A restraint assembly as recited in claim 18 wherein said inflatable member is extendable outwardly from the harness when inflated into said operative orientation.

20. A restraint assembly as recited in claim 19 wherein said inflatable member is disposed on said harness in substantially aligned orientation to a steering wheel of the vehicle.

21. A restraint assembly as recited in claim 18 wherein said inflatable member is mounted on said diagonal belt segment.

22. A restraint assembly as recited in claim 21 wherein said inflatable member is extendable outwardly from said harness when inflated into said operative orientation.

23. A restraint assembly as recited in claim 17 wherein at least one of said lap, chest and diagonal belt segments are adjustable into a plurality of positions relative to a vehicle seat to which it is connected.

24. A restraint assembly as recited in claim 23 further comprising a mounting assembly secured to the vehicle seat and adjustably interconnecting an end of said one belt segment to the seat.

25. A restraint assembly as recited in claim 24 wherein said mounting assembly comprises at least one substantially elongated mount secured to the seat, said end adjustably connected to said mount and movable along the length thereof.

26. A restraint assembly as recited in claim 23 wherein said chest belt segment is positionable at variable spaced distances from said lap belt segment.

27. A restraint assembly as recited in claim 26 further comprising a mounting assembly secured to the vehicle seat and adjustably interconnecting opposite ends of said chest belt segment to the seat.

28. A restraint assembly as recited in claim 27 wherein said mounting assembly comprises two track structures each attached to said seat, said opposite ends of said chest belt segment movably connected to a different one of said track structures and positionable along the length thereof.

29. A restraint assembly as recited in claim 28 wherein said chest belt segment is disposable into a plurality of different substantially parallel orientations relative to said lap belt segment.

30. A restraint assembly as recited in claim 23 further comprising at least one inflatable member mounted on said harness and including a fluid source disposed in communication therewith, said inflatable member cooperatively structured with said fluid source to inflate into an operative orientation protective of the occupant upon the occurrence of an emergency condition.

31. A restraint assembly as recited in claim 30 wherein said inflatable member is mounted on said diagonal belt segment and is extendable outwardly from the harness when inflated into said operative orientation.

32. A restraint assembly as recited in claim 17 wherein at least one of said lap, chest and diagonal belt segments comprise an inflatable section extending along a length thereof and structured to inflate into a protective orientation relative to an occupant upon the occurrence of an emergency condition.

33. A restraint assembly as recited in claim 32 wherein said inflatable section comprises at least one inflatable chamber.

34. A restraint assembly as recited in claim 32 comprising a plurality of inflatable chambers collectively extending along at least a portion of a length of said one belt segment.

35. A restraint assembly as recited in claim 17 wherein said Z-shape configuration comprises said lap belt segment and said chest belt segment being horizontally oriented in substantially parallel relation to one another.

* * * * *